(12) United States Patent
Charling et al.

(10) Patent No.: US 11,282,310 B1
(45) Date of Patent: Mar. 22, 2022

(54) SYSTEM AND METHOD FOR LOCATION-BASED ACCESS CONTROL

(71) Applicant: Geokey, Inc., Fremont, NE (US)

(72) Inventors: Kurtis A. Charling, Oakland, NE (US); Derick Frauendorfer, Omaha, NE (US); Brandon Peterson, Lincoln, NE (US)

(73) Assignee: Geokey, Inc., Fremont, NE (US)

( * ) Notice: Subject to any disclaimer, the term of this patent is extended or adjusted under 35 U.S.C. 154(b) by 0 days.

(21) Appl. No.: 15/993,326

(22) Filed: May 30, 2018

Related U.S. Application Data

(63) Continuation-in-part of application No. 15/783,926, filed on Oct. 13, 2017, which is a continuation-in-part of application No. 15/448,433, filed on Mar. 2, 2017.

(60) Provisional application No. 62/411,387, filed on Oct. 21, 2016, provisional application No. 62/302,775, filed on Mar. 2, 2016.

(51) Int. Cl.
| | |
|---|---|
| *H04L 29/06* | (2006.01) |
| *G07C 9/00* | (2020.01) |
| *H04W 4/021* | (2018.01) |
| *G07C 9/23* | (2020.01) |
| *G07C 9/29* | (2020.01) |
| *G07C 9/25* | (2020.01) |

(52) U.S. Cl.
CPC .......... *G07C 9/00309* (2013.01); *G07C 9/23* (2020.01); *G07C 9/253* (2020.01); *G07C 9/257* (2020.01); *G07C 9/29* (2020.01); *H04W 4/021* (2013.01); *G07C 2009/00349* (2013.01); *G07C 2009/00769* (2013.01)

(58) Field of Classification Search
CPC ...................................................... H04L 63/107
See application file for complete search history.

(56) References Cited

U.S. PATENT DOCUMENTS

| | | | | |
|---|---|---|---|---|
| 8,438,066 | B1* | 5/2013 | Yuen | G06Q 20/206 |
| | | | | 705/16 |
| 9,038,158 | B1* | 5/2015 | MacKay | H04L 9/0872 |
| | | | | 726/10 |
| 9,523,581 | B2* | 12/2016 | Ukezono | G01C 21/20 |
| 10,015,653 | B2* | 7/2018 | Lang | G07C 9/00309 |
| 10,206,099 | B1* | 2/2019 | Trinh | H04L 63/107 |
| 2003/0011467 | A1* | 1/2003 | Suomela | H04W 4/33 |
| | | | | 340/7.1 |
| 2003/0031436 | A1* | 2/2003 | Simmons | G02B 6/4472 |
| | | | | 385/121 |

(Continued)

*Primary Examiner* — William S Powers
(74) *Attorney, Agent, or Firm* — Suiter Swantz pc llo

(57) ABSTRACT

The system includes an electronically controllable access point device and a server. The server includes one or more processors, which are communicatively coupled to the access point device and a portable device. The one or more processors are configured to determine whether a user of the portable device is authorized to access the access point device based on one or more credentials received from the portable device and retrieve a location of the portable device. The one or more processors are further configured to determine whether the location of the portable device is within a pre-defined geographical area. Upon determination of user authorization to the access point device and that the location of the portable device is within the pre-defined geographical area, the one or more processors direct the access point device to provide access to the user.

26 Claims, 20 Drawing Sheets

(56) References Cited

U.S. PATENT DOCUMENTS

| | | | |
|---|---|---|---|
| 2003/0182435 A1 | 9/2003 | Redlich et al. | |
| 2009/0216438 A1* | 8/2009 | Shafer | G01C 21/20 |
| | | | 701/414 |
| 2012/0030578 A1* | 2/2012 | Athsani | H04M 1/72403 |
| | | | 715/738 |
| 2012/0126974 A1* | 5/2012 | Phillips | H04W 4/021 |
| | | | 340/539.13 |
| 2012/0202459 A1 | 8/2012 | Martell et al. | |
| 2014/0282877 A1* | 9/2014 | Mahaffey | H04L 63/0853 |
| | | | 726/3 |
| 2017/0171183 A1* | 6/2017 | Lingappa | H04L 63/107 |

\* cited by examiner

SYSTEM AND METHOD FOR LOCATION-BASED ACCESS CONTROL

CROSS-REFERENCE TO RELATED APPLICATION

The present application constitutes a continuation-in-part of and claims priority to U.S. Non-Provisional patent application Ser. No. 15/783,926 entitled SYSTEM AND METHOD FOR LOCATION-BASED ACCESS CONTROL, filed Oct. 13, 2017, naming Kurtis A. Charling, Derick Frauendorfer and Brandon Peterson as an inventors, which claims priority to U.S. Non-Provisional patent application Ser. No. 15/448,433, entitled SYSTEM AND METHOD FOR LOCATION-BASED ACCESS CONTROL, filed Mar. 2, 2017, naming Kurtis A. Charling, Derick Frauendorfer and Brandon Peterson as an inventors, which claims priority to U.S. Provisional Patent Application Ser. No. 62/302,775, entitled CONTROLLED ACCESS USING THE LOCATION OF A PORTABLE DEVICE, filed Mar. 2, 2016, naming Kurtis A. Charling, Derick Frauendorfer and Brandon Peterson as an inventors; and U.S. Provisional Patent Application Ser. No. 62/411,387, entitled SYSTEM AND METHOD FOR PROVIDING ACCESS CONTROL, filed Oct. 21, 2016, naming Kurtis A. Charling, Derick Frauendorfer and Brandon Peterson as an inventors. Each of the above listed applications is incorporated herein by reference in their entirety.

TECHNICAL FIELD

The present invention generally relates to building, resource, and asset access control, and, more particularly, to a system and method for providing access control based on the location information associated with portable devices.

BACKGROUND

An access control system (ACS) is used to selectively restrict access into a building/location or restrict the use of a particular asset/resource, such as, but not limited to, a building, a room, a vehicle, a vending machine, and the like. For example, locks and login credentials are two analogous mechanisms of access control that are used to restrict access to places, assets, and/or resources.

Permission to access a place, asset, and/or resource is controlled by an ACS through authorization, which involves specifying access control through a defined access policy. The ACS can authorize and grant permission to places or assets/resources through a number of different mechanisms, which include, but are not limited to, the standard lock and key, a keyless entry system (e.g., fob or card), a remote keyless entry (RKE) (e.g., a keypad), or through valid credentials (e.g., username and password or individual identification).

A keyless entry system (KES) offers an increased level of convenience over a standard lock and key by eliminating the need to physically find, insert, and turn a traditional key. With a KES, users may simply approach a locked KES lock and, if the user is within the necessary range, determined locally between a sensor near the lock and a device held by the user, the lock directly grants the user access if authorization is met. A KES, when compared with an RKE, offers reduced user interaction with the ACS through the hands free authorization stored by the user's KES.

Several challenges and problems exist with a KES. Current KES's, such as fobs and keycards, can be passed onto other users who lack proper authentication through a simple change in hand or passing of the KES. Additionally, KES's require advanced/expensive hardware, such as Bluetooth and Wi-Fi enabled devices. Furthermore, the range or distance needed by the KES to unlock the KES lock cannot be customized, as the device has a finite range due to a number of factors, such as, but not limited to, frequency, power, and obstacles. Therefore, there exists a need to provide an improved user access system and method which cure the defects of the prior approaches identified above.

SUMMARY

A system is disclosed, in accordance with one or more embodiments of the present disclosure. In one embodiment, the system includes a portable device. In another embodiment, the system includes an access point device. In another embodiment, the access point device includes an access mechanism for selectively providing access to an authorized user to the access point device. In another embodiment, the system includes a server including one or more processors, the one or more processors communicatively coupled to the access point device and the portable device, wherein the one or more processors are configured to execute program instructions stored in memory, the program instructions configured to cause the one or more processors to: determine whether a user of the portable device is authorized to access the access point device based on one or more credentials received from the portable device; retrieve a location of the portable device; determine whether the location of the portable device is within a pre-defined geographical region; and upon determination of user authorization to the access point device and that the location of the portable device is within the pre-defined region, direct the access mechanism to provide access to the user.

A system is disclosed, in accordance with one or more embodiments of the present disclosure. In one embodiment, the system includes a server. In one embodiment, the system includes one or more processors, the one or more processors communicatively coupled to an access point device and a portable device, wherein the one or more processors are configured to execute program instructions stored in memory, the program instructions configured to cause the one or more processors to: determine whether a user of the portable device is authorized to access the access point device based on one or more credentials received from the portable device; retrieve a location of the portable device; determine whether the location of the portable device is within a pre-defined geographical region; and upon determination of user authorization to the access point device and that the location of the portable device is within the pre-defined geographical region, direct an access mechanism of the access point device to provide access to the user.

A system is disclosed, in accordance with one or more embodiments of the present disclosure. In one embodiment, the system includes a portable device, an administrative device, and a server including one or more processors. In one embodiment, the one or more processors are communicatively coupled to the portable device. In another embodiment, the one or more processors are configured to execute program instructions stored in memory, the program instructions configured to cause the one or more processors to: retrieve a location of the portable device at a plurality of time intervals; determine whether the location of the portable device is within a pre-defined geographical region at each time interval of the plurality of time intervals; store the location of the portable device at each specified time interval of the plurality of time intervals in memory; calculate a duration metric indicative of the duration in which the location of the portable device is within the pre-defined geographical region; and transmit the duration value to the administrative device. In another embodiment, an administrator of the administrative device may implement one or more actions in response to the received duration metric.

A method is disclosed, in accordance with one or more embodiments of the present disclosure. In one embodiment, the method includes receiving one or more credentials from a portable device. In another embodiment, the method includes determining whether a user of a portable device is authorized to access an access point device based on the one or more credentials. In another embodiment, the method includes retrieving a location of the portable device. In another embodiment, the method includes providing access to the access point based on the retrieved location of the portable device and the one or more credentials received from the portable device.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and, together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

Referring generally to FIGS. 1A through 14, embodiments of the present disclosure are directed to a system and method for providing location-based access control to one or more assets or resources.

Embodiments of the present disclosure are directed to a system which may utilize a server to determine whether a user, via a portable device, is authorized to access a given access point device. As used throughout the present disclosure, the term "portable device" may include, but is not limited to, a smartphone, a laptop, a tablet, a wearable device, and the like. Similarly, the term "access point device" may include any controlled equipment including, but not limited to, access controlled entryways, electronic resources, or other secured or controlled devices. Access may include, but is not limited to, the locking and unlocking of controlled access entry such as a secured doorway or entryway. Access may also include, but is not limited to, controlling access to equipment such as vending machines, lockers, bike racks, washing/drying machines, vehicles, and/or other electronic resources.

Embodiments of the present disclosure are directed to controlling access to one or more resources/assets based on one or more parameters including, but not limited to, the location of the portable device, one or more credentials entered into the portable device, one or more additional credentials received from the portable device, the time access is requested, and the like. The location (e.g., latitude and longitude) of the portable device may be determined by its geolocation (e.g., utilizing onboard chipset or location services), wireless triangulation, proximity to a sensor, and/or access and authentication to local networked wireless access points. Controlled access may be provided when the portable device is within a defined distance or area of the given access point, or, alternatively, after having already received access to defined or related access points. Additional embodiments of the present disclosure are directed to the adjustment of the threshold distance/area to allow for access to an access point by an authorized representative or administrator of the place, asset, and/or resource.

Additional embodiments of the present disclosure are directed to the use of a system including a portable device to provide access to one or more resources, and to track the duration of the use of the one or more resources. Use-tracking capabilities of the present disclosure may be implemented in a wide variety of applications, including any resource and/or service which charges fees per unit time (e.g., gym memberships, theme parks, toll-roads, and the like).

Figure 1A:
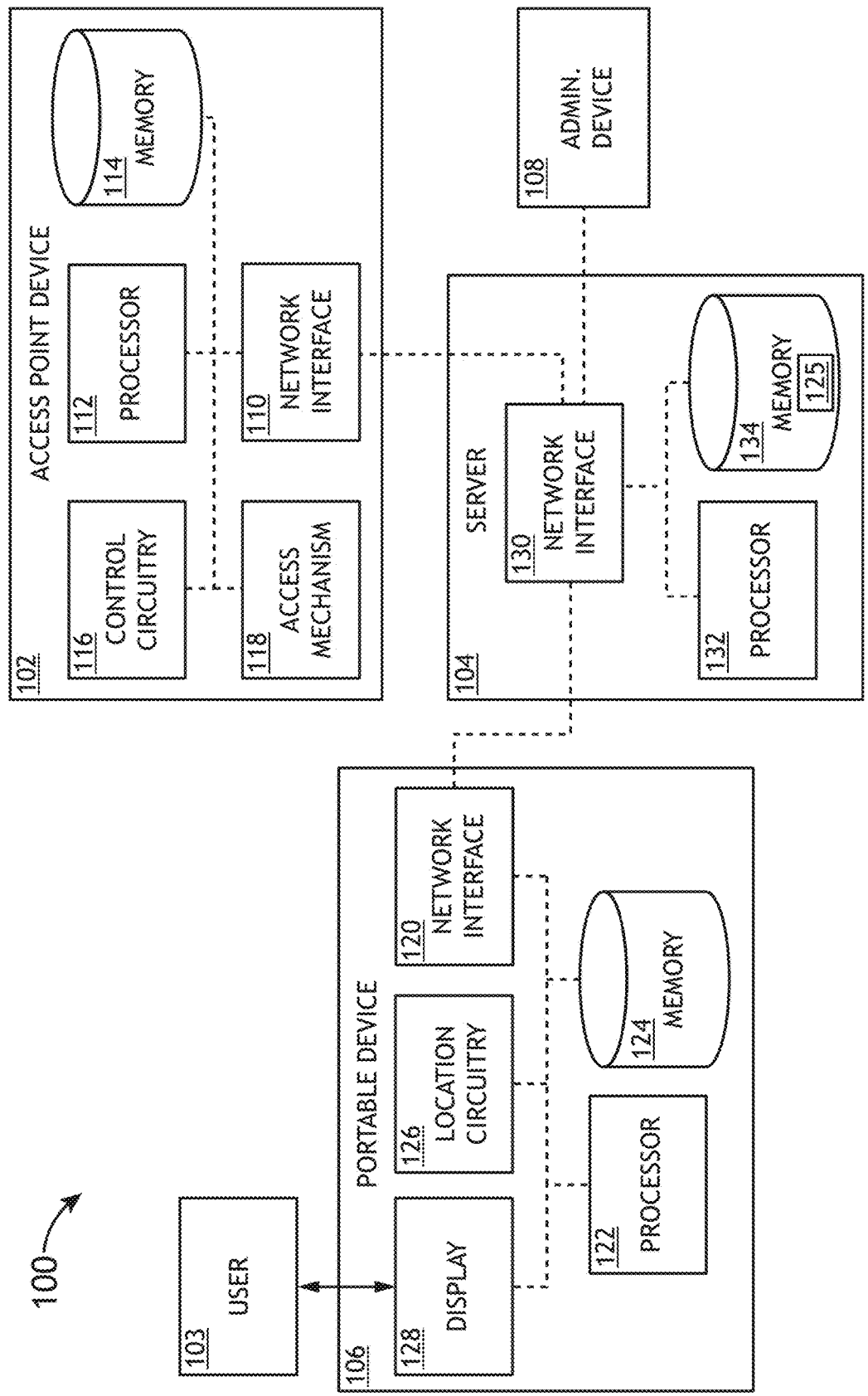
FIGS. 1A-1B illustrate a block diagram view of a system for providing location-based access control of a controllable access point, in accordance with one or more embodiments of the present disclosure.
Figure 1B:
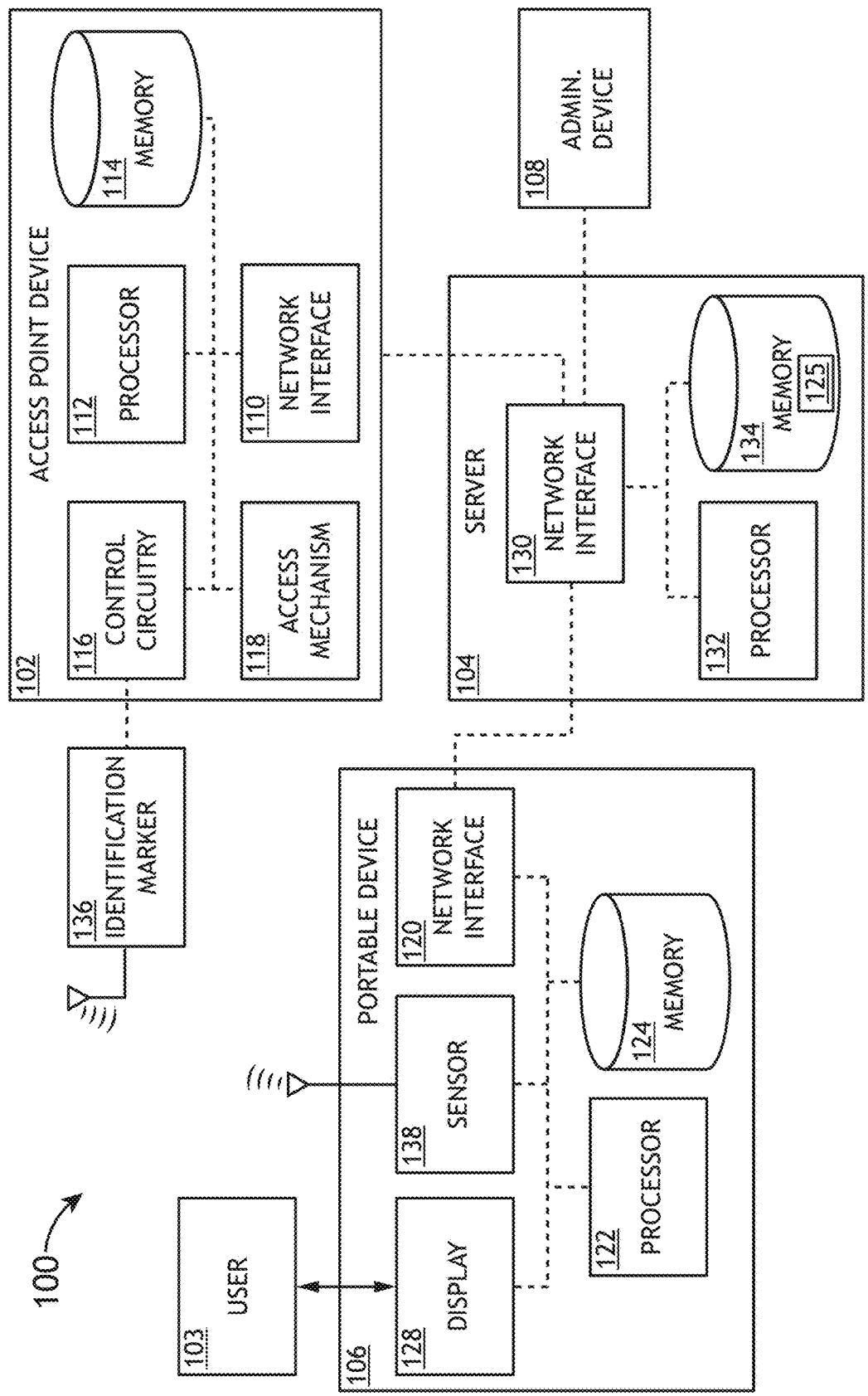

FIGS. 1A-1B illustrate a system 100 for providing location-based access control of a controllable access point, in accordance with one or more embodiments of the present disclosure. In one embodiment, system 100 includes an access point device 102, a server 104, and a portable device 106 operable by a user 103.

The portable device 106 may include any portable/mobile communication device known in the art such as, but not limited to, a smartphone, a laptop, an ultrabook, a personal digital assistant, a tablet, a wearable electronic device (e.g., health tracker, smartwatch, etc.), or a dedicated or customized electronic device. In another embodiment, the portable device 106 includes a network interface 120, one or more processors 122, memory 124, location circuitry 126, and a display 128.

In one embodiment, the portable device 106 includes a user interface. The user interface may include any user interface known in the art. For example, the user interface may include, but is not limited to, an input device (not shown) and a display 128 (e.g., touchscreen enabled LCD, LED, or OLED display). The input device may include any input device known in the art. For example, the input device may include, but is not limited to, a touchscreen interface, a keyboard, a bezel mounted input device, a mouse, a touchpad, a trackball, and the like. The display 128 may include any display device known in the art. For example, the display 128 may include an audio display (e.g., speakers for sounds or voice commands or indicators) and/or a graphical display. For instance, in the case of a graphical display, the display 128 may include, but is not limited to, an LCD display, one or more LED displays, or one or more OLED displays. In this regard, the one or more display devices may be configured to utilize text-based messages, symbols, indicia, or other identifiable visual characters, symbols or graphical representations. In another embodiment, the input device and the display 128 may form an integrated touchscreen display.

In another embodiment, the portable device 106 includes location circuitry 126. The location circuitry 126 may include any location circuitry or device (e.g., GPS circuitry and/or WiFi location services circuitry) suitable for providing one or more location services to the portable device 106. For example, the location circuitry 126 may include, but is not limited to, a global positioning receiver configured to receive global position information from a global position system (e.g., GPS, GNSS, GLONASS and the like). For instance, the location circuitry 126 may include, but is not limited to, a GPS chip of the portable device 106. In this regard, the portable device 106 may utilize the GPS chip of the portable device 106 and corresponding GPS services provided to the portable device 106 to determine the location of the portable device 106 and then transmit this location information (e.g., latitude and longitude) to the server 104. By way of another example, the location circuitry 126 may include, but is not limited to, RF-based location circuitry. For instance, the location circuitry 126 may include, but is not limited to, WiFi-based location services circuitry (and software). In this regard, the portable device 106 may utilize the Wi-Fi circuitry of the portable device 106 and corresponding WiFi location services to determine the location of the portable device 106 and then transmit this location information to the server 104.

In another embodiment, portable device 106 is communicatively coupled to a server 104 via network interface 120. Network interface 120 of portable device may include any network interface circuitry or network interface device suitable for interfacing with server 104. For example, the network interface 110 may include wireline-based interface devices (e.g., DSL-based interconnection, cable-based interconnection, T9-based interconnection, and the like). In another embodiment, the network interface 110 may include a wireless-based interface device employing GSM, GPRS, CDMA, EV-DO, EDGE, WiMAX, 3G, 4G, 4G LTE, 5G, WiFi protocols, RF, LoRa, and the like. By way of another example, network interface 110 may include any network interface circuitry configured to interface with a cloud-based architecture.

In one embodiment, a user 103 may enter in one or more credentials (e.g., password, PIN, and/or biometric information) into the portable device 106 in order to access an access point device 102. In another embodiment, the portable device 106 may transmit the one or more credentials entered into the portable device 106 to the server 104. It is noted herein that the credentials of user 103 may take any form known in the art. For example, the IP address of the portable device 106 of the user 103 may act as the credentials for the user. In another embodiment, the server 104 may determine whether the user 103 of the portable device 106 is authorized to access the access point device 102 based on one or more received credentials.

For example, the server 104 may compare the one or more credentials received from the portable device 106 to an access database 125 maintained in memory 124, which contains a correlated listing of user IDs and access levels, to determine if the received credentials correspond to the access requested by the user 103. In an alternative and/or additional embodiment, the credential verification process may be carried out on the portable device 106 instead of the server 104. In this embodiment, the portable device 106 may determine whether a user 103 of the portable device 106 is authorized to access the access point device 102 based on one or more credentials (e.g., password, PIN, IP address, and/or biometric information) received from the portable device 106. In an additional and/or alternative embodiment, authorized access to the portable device 106 may act as sufficient credentials to access the access point device 102. By way of example, a user 103 may unlock a portable device 106 via a password. Upon entering the password and unlocking the portable device 106, system 100 may be configured to recognize that the user 103 is authorized to access the portable device 106, and is thereby also authorized to access the access point 102.

In another embodiment, the server 104 is configured to retrieve a location of the portable device 106. For example, the portable device 106 may acquire its location via one or more location services and on-board location circuitry 126 (e.g., GPS services and/or WiFi location services) and then transmit that location information to the server 104. In another embodiment, the server 104 is configured to determine whether the location of the portable device 106 is within a pre-defined geographical fence (i.e. within a pre-defined distance from the access point device 102 or an area around the access point device 102). For example, the server 104 may compare the latitude and longitude of the portable device 106 to the latitude and longitude of the access point device 102. By way of another example, server 104 may be configured to use received signal strength indicators (RSSI) to determine the distance between the portable device 106 and the access point device 102. In the case of a distance comparison, the server 104 may compare the relative distance between the portable device 106 and the access point device 102 and compare the relative distance to a pre-defined threshold distance. In the case of an area comparison, the server 104 may whether the location of the portable device 106 resides within the pre-defined geographical area or region. In an additional and/or alternative embodiment, the location verification process may be carried out on the portable device 106 instead of the server 104. In this embodiment, the portable device 106 may determine the location of the portable device relative to the access point device 102, and transmit the location of the portable device 106 when the portable device 106 is within a pre-defined distance, geographical area, region, etc., relative to the access point device.

It is noted herein that the term "pre-defined geographical region," and like terms, may include any fixed and/or transient region of importance to system 100. For example, a "pre-defined geographical region" may include an area located within an office building. By way of another example, a "pre-defined geographical region" may include the area within a certain radius of an access point device 102. For instance, in embodiments where the access point device 102 is mobile, such as an autonomous vehicle, a "pre-defined geographical region" may include the area within a selected distance (e.g., 15 feet) of the autonomous vehicle (e.g., access point device 102) as the vehicle moves around. In this regard, the term "pre-defined geographical region," and like terms, may refer to any area, region, boundary, geo-fenced boundary, and the like. Furthermore, a "pre-defined geographical region" may or may not be defined relative to any particular location or object such as, but not limited to, an access point device 102, a landmark, and the like.

It is noted herein that system 100 may use any method known in the art to determine the location of portable device 106 without departing from the spirit and scope of the present disclosure. Furthermore, it is additionally noted that embodiments of the present disclosure may not require system 100 to determine the location/geolocation of portable device 106 to provide access to access point device 102. In this regard, system 100 may only require authorized credentials to provide a portable device 106 with access to access point device 102.

In one embodiment, server 104 is configured to receive location information and/or one or more credentials from the portable device 106 via a network interface 130. In one embodiment, the location of portable device 106 is time-stamped and stored in memory 134. It is noted herein that the description associated with network interface 120 may be regarded as applying to network interface 130, unless noted otherwise herein. In another embodiment, one or more processors 132 are configured to execute a set of program instructions stored on memory 134, wherein the program instructions are configured to cause the one or more processors 132 to carry out one or more steps of the present disclosure.

In another embodiment, the one or more processors 132 of the server 104 are configured to determine whether a user 103 (e.g., portable device 106) is authorized to access an access point device 102 based on the location data and/or credentials received from the portable device 106. It is noted herein that the one or more processors 132 may utilize additional and/or alternative parameters in determining whether a user 103 (e.g., portable device 106) is authorized to access an access point device 102. Alternative and/or additional parameters may include, but are not limited to, time of day restrictions, and the like.

In another embodiment, if the server 104 determines that a user 103 is not authorized to access to the access point device 102, the server 104 transmits an "unauthorized access" signal to the access point device 102. Alternatively, upon determining that a user 103 is not authorized to access to the access point device 102, the server 104 may simply decline to transmit a signal to the access point device 102, indicating that the user is not authorized.

In another embodiment, if the server 104 determines that a user is authorized to access the access point device 102, the server 104 may transmit an "authorized access" signal to the access point device 102. For example, upon verifying the location and/or the credentials of the user 103 of the portable device 106, the server 104 may transmit one or more authorized access signals to the access point device 102.

In one embodiment, access point device 102 includes a network interface 110, one or more processors 112, memory 114, control circuitry 116, and access mechanism 118. The access point device 102 may be configured to provide a user 103, via a portable device 106, access to one or more spaces, buildings, rooms, assets, and/or resources associated with the access point device 102. In this regard, the access point device 102 may include any securable device or component that may be used to secure spaces, buildings, rooms, assets, and/or resources. For example, the access point device 102 may include, but is not limited to, a networked and electronically lockable doorway/entry way, networked and electronically controllable vending machine, networked and electronically controllable vehicle (doors and/or starter) or networked electronic resources (e.g., computer system, memory, folders, and/or files). By further way of example, the access point device 102 may include, but is not limited to, access points for ticketing venues (e.g., turnstiles, elevators, and the like), access points for gym facilities, rentable lockers, storage units, washer/dyer units, rentable bicycle racks, and the like. By further way of example, access point device 102 may include, but is not limited to, access points for bridges and toll roads. By further way of example, access point device 102 may be portable (e.g., rentable cars, Zipcars, drones, autonomous vehicles, Uber/Lyft vehicles, taxis, and the like).

In one embodiment, a network interface 110 of access point device 102 may be configured to receive one or more signals from server 104. Network interface 110 of access point device 102 may include any network interface circuitry or network interface device suitable for interfacing with server 104. For example, the network interface 110 may include wireline-based interface devices (e.g., DSL-based interconnection, cable-based interconnection, T9-based interconnection, and the like). In another embodiment, the network interface 110 may include a wireless-based interface device employing GSM, GPRS, CDMA, EV-DO, EDGE, WiMAX, 3G, 4G, 4G LTE, 5G, WiFi protocols, RF, LoRa, and the like. By way of another example, network interface 110 may include any network interface circuitry configured to interface with a cloud-based architecture.

In another embodiment, one or more processors 112 may be configured to execute a set of program instructions stored on memory 114, wherein the program instructions cause the one or more processors 112 to carry out one or more steps of the present disclosure. In one embodiment, the one or more processors 112 are configured to receive signals from server 104 via network interface 110. In another embodiment, the one or more processors 112 are configured to transmit one or more control signals to the access mechanism via the control circuitry 116. In this regard, the control circuitry 116 of the access point device 102 may include any circuitry configured to interface with network interface 110, the one or more processors 116, and access mechanism 118. In another embodiment, control signals transmitted to the access mechanism 118 cause the access mechanism 118 to carry out one or more functions in response to the one or more signals received form server 104.

By way of example, where the access point device 102 is a door, the access point device 102 may receive one or more "unauthorized access" signals from server 104 via network interface 110 indicating that a user 103 (via portable device 106) is unauthorized to access the door (e.g., the access point device 102). In this example, the one or more processors 112 may be configured to receive the unauthorized access signal and transmit a control signal to access mechanism 118 via control circuitry 116, causing the access mechanism 118 to remain in a "locked" configuration.

By way of another example, the access point device 102 may receive one or more "authorized access" signals from server 104 via network interface 110 indicating that a user 103 (via portable device 106) is authorized to access the door (e.g., the access point device 102). In this example, the one or more processors 112 may be configured to receive the authorized access signal and transmit a control signal to access mechanism 118 via control circuitry 116, causing the access mechanism 118 to carry out one or more functions in order to provide the user 103 access to the access point device 102. The one or more functions may include, but are not limited to, directing an electronic lock on the door to disengage, directing a starter on a car to allow a user to start the car, providing access to electronic resources, dispensing a selected item or tier of item from a vending machine, providing access to a tier of floors in a multi-floor building, and the like.

The access mechanism 118 may include any electronically controllable devices, components, processors, memory, or software/firmware modules suitable for controlling access to one or more resources. In one embodiment, in the case where the access point device 102 is an electronically lockable doorway, the access mechanism 118 may include, but is not limited to, one or more solenoids configured to actuate electronically controllable locks, which may be electronically engaged or disengaged in response to one or more control signals from the control circuitry 116. By way of another example, access mechanism 118 may include one or more electromagnetic locks (e.g., "maglocks") configured to engage (e.g., lock) and/or disengage (e.g., unlock) in response to one or more control signals from the control circuitry 116.

In another embodiment, in the case where the access point device 102 is a networked vending machine, the access mechanism 118 may include, but is not limited to, one or more dispensing devices (e.g., solenoid, actuator, release doors, etc.), which may be electronically triggered to release one or more items from the vending machine in response to one or more control signals from the control circuitry 116. In one embodiment, were the access point device 102 is a vending machine, user 103 access to the vending machine may be based on a tiered access scheme. In this regard, depending on the credentials of a user 103, the user 103 (e.g., portable device 106) may have access to only particular rows (e.g., "tiers") of the vending machine. By way of example, a first user 103 may have the credentials sufficient to access only the first three rows of a vending machine (e.g., access point device 102). By way of another example, a second user 103 may have the credentials sufficient to access every row of the vending machine (e.g., access point device 102).

In another embodiment, in the case where the access point device 102 is a networked electronic resource, access point device 102 may include the network interface 110, the one or more processors 112, and the memory 114. In this regard, where the access point device 102 is a networked electronic resource, the access point device 102 may not include control circuitry 116 and/or access mechanism 118. For example, where the access point device is a networked electronic resource (e.g., computer, file, and the like), the one or more processors 112 may be configured to execute access control software to selectively provide a user 103 with access to the one or more electronic resources. In this regard, the one or more processors 112 may include one or more processors of a desktop computer, mainframe of a terminal computer, a portable computer (e.g., laptop), and/or server, which execute access control software to control access to the access point device 102. The access control software may selectively unlock/lock access to the electronic resources in response to one or more control signals from the server 104. In an additional and/or alternative embodiment, the access point device 102 may provide security for one or more sub-systems of an electronic system/electronic resource. For example, access to a computer or server may generally be accessible to the public or a group of individuals, while one or more restricted files or folders (maintained in memory) of the computer or server may be accessible only to those which are given access by the server 104 based on verified location and/or credentials.

By way of another example, the access point device 102 may be portable. For instance, access point device 102 may include a vehicle such as a taxi, an Uber car, or a Lyft car (referred to generally as an "Uber vehicle"). In this example, when an Uber vehicle approaches a user 103, system 100 may determine that the user 103 who ordered the Uber vehicle is authorized to access the Uber vehicle (e.g., access point device 102), and allow the user 103 to open the door to access the Uber vehicle. Similarly, access point device 102 may include an autonomous vehicle. In this example, when an autonomous vehicle approaches a user 103, system 100 may determine that a user 103 is authorized to access the autonomous vehicle (e.g., access point device 102), and allow the user 103 to open the door to access the autonomous vehicle. By way of another example, the access point device 102 may include a delivery drone. The delivery drone may be configured to deliver packages, pizzas, take-out food orders, and the like. In this example, when the delivery drone approaches a user 103, system 100 may determine that the user 103 paid for the package carried by the delivery drone, and is thereby authorized to access the package of the delivery drone (e.g., access point device).

In some embodiments, the access point device 102 may further include location circuitry. By way of example, in embodiments in which the access point device 102 is portable (e.g., a drone, an autonomous vehicle, and the like), the access point device 102 may include location circuitry. The location circuitry may include any location circuitry or device (e.g., GPS circuitry and/or WiFi location services circuitry) suitable for providing one or more location services to the access point device 102. For example, the location circuitry may include, but is not limited to, a global positioning receiver configured to receive global position information from a global position system (e.g., GPS, GNSS, GLONASS and the like). It is noted herein that the discussion regarding location circuitry 126 of portable device 106 may be regarded as applying to location circuitry of access point device 102, unless noted otherwise herein.

As noted previously herein, additional and/or alternative embodiments of the present disclosure are directed to the use of system 100 to carry out use-tracking applications. In this regard, system 100 may be used to carry out one or more applications including, but not limited to, providing a user 103 access to a given resource via an access point device 102, tracking the duration (e.g., time-tracking) or distance which a user 103 has accessed a given resource, and the like. It is noted herein that use-tracking capabilities of system 100 may be used in a wide variety of applications. By way of example, use-tracking capabilities of system 100 may be used in conjunction with any resource or service which charges fees per unit time, per unit distance, or any other metric. By way of another example, use-tracking capabilities of system 100 may be used to collect data regarding the amount of time individuals spend in certain locations, performing certain activities, accessing particular resources, and the like.

By way of example, system 100 may include a server 104 including one or more processors 132. In order to carry out the use-tracking capabilities of system 100, the one or more processors 132 may be configured to retrieve a location of a portable device 106 at a plurality of time intervals, determine whether the location of the portable device is within a pre-defined geographical region at each timer interval in the plurality of time intervals, store the location of the portable device at each specified time of the plurality of time intervals in memory 134, calculate a duration metric indicative of the duration in which the location of the portable device is within the pre-defined geographical region, and transmit the duration metric to an administrative device 108. In this example, an administrator of the administrative device 108 may implement one or more actions in response to the received duration metric. The one or more actions implemented in response to the received duration metric may include, but are not limited to, charging fees to a user according to the duration metric, billing a user according to the duration metric, adjusting one or more operating parameters of a business, and the like. It is noted herein that the above description associated with the use-tracking capabilities of system 100 is provided merely for illustrative purposes, and is not to be regarded as a limitation on the scope of the present disclosure.

By way of an example, fees for a gym membership or attendance at a theme park may be charged per unit time. In this regard, the cost to each user 103 is dependent on the duration of time the user 103 spends in the gym/theme park. In this example, the gym/theme park may include one or more access point devices 102. In this example, system 100 may continuously and/or periodically determine the location of users 103 (e.g., portable devices 106) and determine whether the users 103 (e.g., portable devices 106) are within a pre-defined geographical region, such as the property of the gym facility, the borders of the theme park, and the like. System 100 may then store time-stamped data regarding the location of each portable device 106 over time in memory 134. Furthermore, system 100 may utilize the time-stamped location data to determine the duration (e.g., duration metric) in which portable devices 106 are located within the gym/theme park (e.g., pre-defined geographical regions). The user 103 of each portable device 106 may then be charged (e.g., charged automatically, charged via an administrative device 108, and the like) according to the time spent within the respective gym/theme park (e.g., duration metric).

By way of another example, use-tracking capabilities of system 100 may be used to collect data regarding the amount of time individuals spend in a particular location (e.g., pre-defined geographical region), performing a particular activity, or accessing a particular resource. Attendant advantages of this data tracking capability may prove to be useful for a wide variety of industries and businesses. For instance, a mall may wish to determine how long the average person spends shopping within the mall. By implementing system 100 of the present disclosure, the mall may be able to track the amount of time each user 103 (e.g., portable device 106) spends in the mall (e.g., pre-defined geographical region). Using the average duration an individual spends in the mall, the mall may then be able to take one or more actions and/or alter one or more operating parameters of the mall. Actions which may be taken in response to the average duration spent in the mall may include, but are not limited to, altering the types of advertisements, altering the amount of advertising, altering the types of stores within the mall, altering the entertainment available at the mall, and the like. It is noted herein that the listed operating parameters which may be adjusted in response to data collected by system 100 are not limited to those which have been listed. In this regard, the operating parameters which may be adjusted in response to data collected by system 100 may vary based on the data collected, the industry implementing system 100, the business implementing system 100, the goals of the business implementing system 100, and the like.

In another embodiment, the system 100 includes an administrative device 108. The administrative device 108 may include any networked electronic device capable of communicating with the server 104. In this embodiment, an administrator, via the administrative device 108, may adjust access to access point devices 102 and/or user data. For example, the administrator may adjust the threshold distances or areas for allowing access to a given access point device 102 via the administrative device 108. By way of another example, the administrator may grant and revoke authorization to a user 103 by adding the user 103 and their credentials to the database 125 via administrative device 108. For instance, through one or more web services, an administrator is able to add remove and edit access points and user data via the administrative device 108.

Although much of the present disclosure has described the system 100 in the context of the credential verification and location verification taking place on the server 104, such a configuration should not be interpreted as a limitation on the scope of the present disclosure. Rather, the credential verification process and/or the location verification process may be executed on the portable device 106. In this embodiment, the portable device 106 verify the credentials and/or location of the user 103/portable device 106 and then transmit the results of the verification process(es) to the server 104. The server 104 may then relay the pertinent command (e.g., access granted or access denied) to the given access point device 102.

FIG. 1B illustrates a block diagram view of a system 100 for providing location-based access control of a controllable access point, in accordance with one or more embodiments of the present disclosure. It is noted herein that the description associated with system 100 of FIG. 1A may be regarded as applying to system 100 of FIG. 1B, unless noted otherwise herein.

In one embodiment, as shown in FIG. 1B, the location circuitry of the portable device 106 may include a sensor 138 configured to interact with one or more identification markers 136 to determine the approximate location of the portable device 106. For example, system 100 may include, but is not limited to, one or more identification markers 136 disposed on, within, or near the access point device 102. In this regard, upon determining that the portable device 106 is proximate to the identification marker 136 of the access point device 102, the server 104 may determine that the portable device 106 is sufficiently close to the access point device 102 to provide access to the user 103. The identification marker 136 may include, but is not limited to, a near-field communication (NFC) tag, a low-energy blue tooth (BLE) transmitter, an RFID tag, an ultrasonic emitter, and the like. For example, the portable device 106 may include, but is not limited to, an NFC reader configured for reading the NFC tag of the access point device 102. Alternatively, the portable device 106 may include, but is not limited to, an NFC reader configured for reading an RFID tag of the access point device 102. By way of another example, the portable device 106 may include, but is not limited to, a BLE receiver configured for reading a BLE transmitter/beacon of the access point device 102. By way of another example, the portable device 106 may include, but is not limited to, a microphone configured for receiving one or more audio signals or chirps (e.g., ultrasonic signals or chirps) from an audio transmitter (e.g., ultrasonic transducer) of the access point device 102.

Figure 1D:
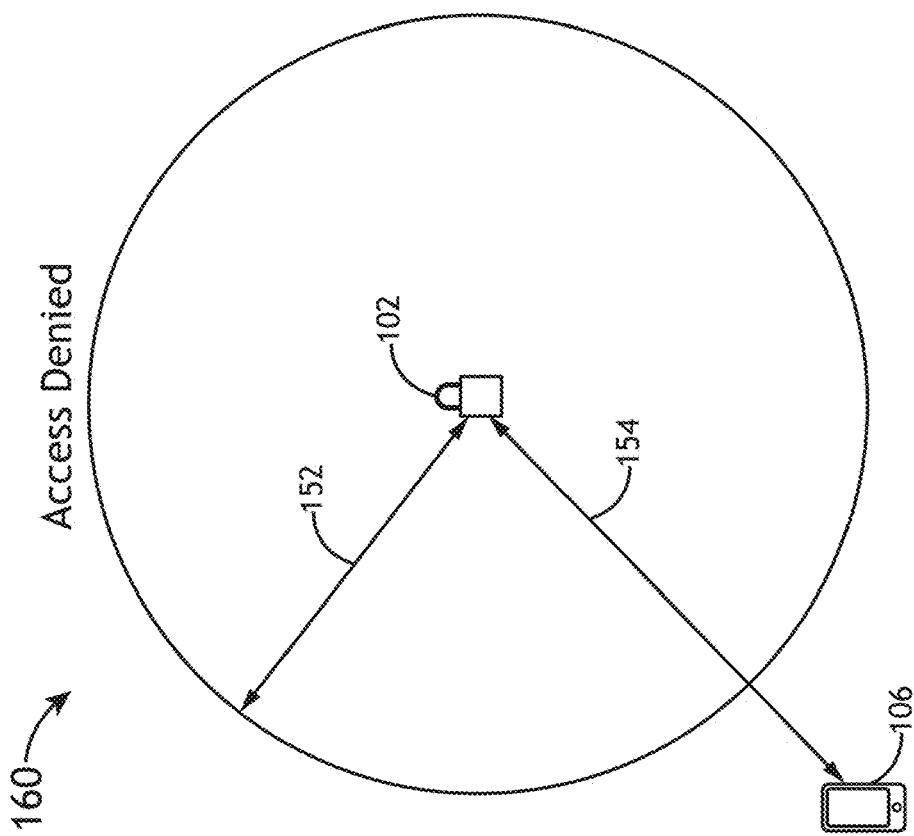
FIGS. 1C and 1D illustrate conceptual views of a user of the portable device being granted or denied access to an access point device, in accordance with one or more embodiments of the present disclosure.
Figure 1C:
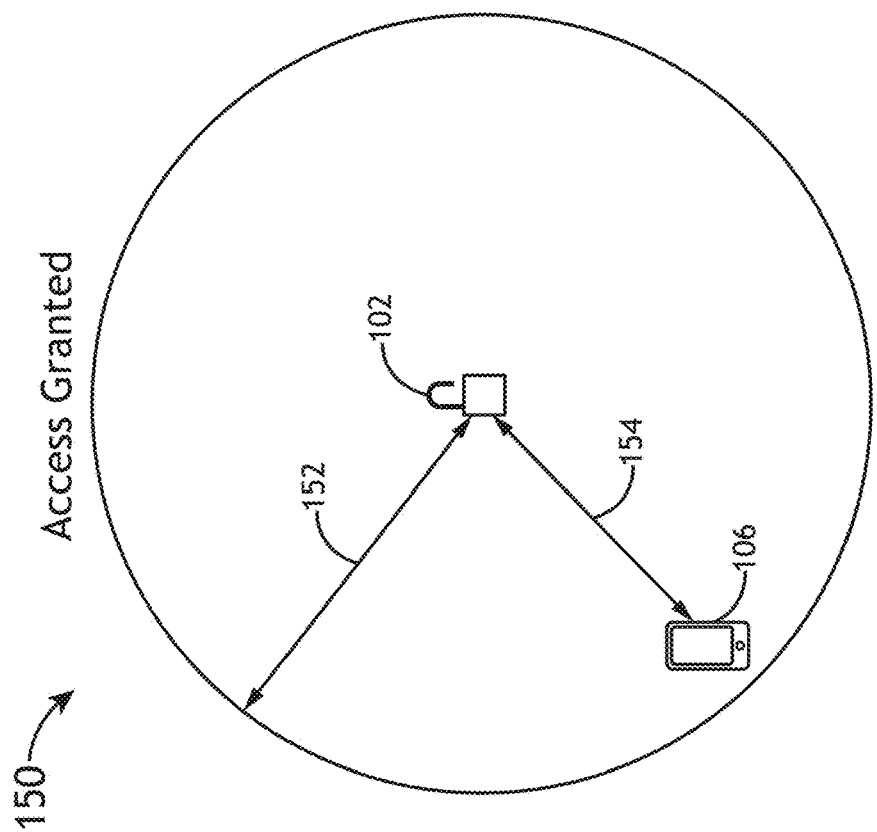

FIGS. 1C and 1D illustrate conceptual views of a user 103 of a portable device 106 being granted or denied access to an access point device 102, in accordance with one or more embodiments of the present disclosure.

As shown in FIG. 1C, in settings where the distance 154 between the portable device 106 and the access point device 102 is less than a pre-defined distance threshold 152, the server 104 may transmit one or more signals to access point device 102, which may cause the access mechanism 118 perform one or more functions which may provide the user 103 access to the access point device 102. By way of example, the one or more functions which may provide the user 103 access to the access point device may include, but are not limited to, transmitting an electrical signal to a solenoid configured to cause a lock on a door to disengage, providing access to electronic resources, and the like). Alternatively, server 104 may transmit one or more signals to access point device 102, which may cause the access mechanism 118 to perform one or more functions which may provide the user 103 access to the access point device 102 when the portable device 106 is within a pre-defined area. It is noted that the defined area is not limited to a circular area as that depicted in FIG. 1C, which is provided merely for illustrative purposes. In some embodiments, the system 100 may grant access to the user 103 only after user-provided credentials (e.g., username/passcode, pin, biometric data, and the like) are passed by the server 104. In contrast, as shown in FIG. 1D, settings where the distance 154 between the portable device 106 and the access point device 102 is greater than the pre-defined distance threshold 152, system 100 may be configured to deny access to the access point device 102. As noted previously herein, system 100 may additionally and/or alternatively be configured to allow access to an access point device 102 without the need to determine the location of the portable device 106. For example, system 100 may be configured to allow a portable device 106 access to an access point device 102 based on credentials alone.

Figure 1E:
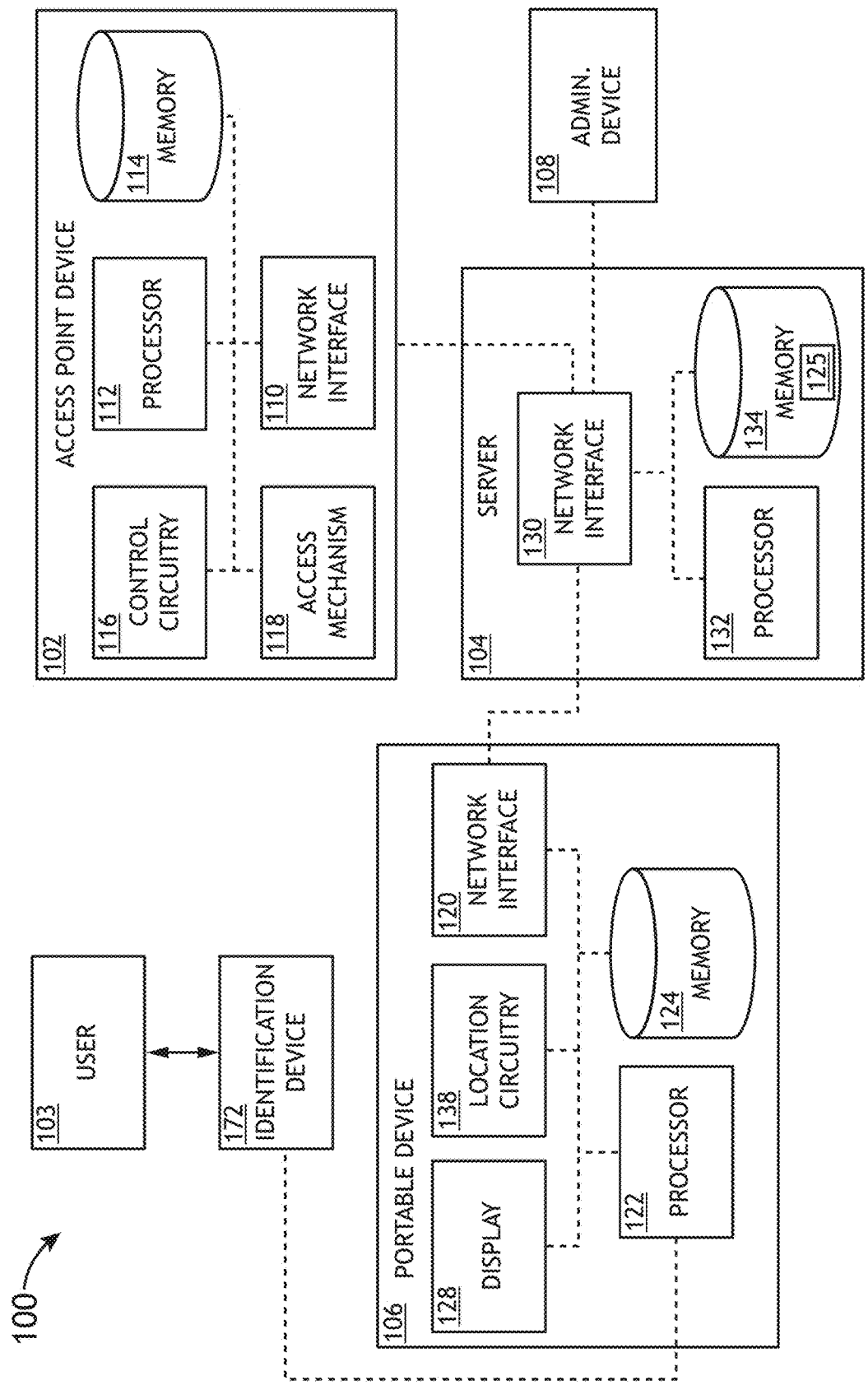
FIGS. 1E and 1F illustrate block diagram views of a system for providing location-based access control of a controllable access point, in accordance with one or more embodiments of the present disclosure.

FIG. 1E illustrates a block diagram view of a system 100 for providing location-based access control of a controllable access point, in accordance with one or more embodiments of the present disclosure. It is noted herein that the description associated with systems 100 of FIGS. 1A and 1B may be regarded as applying to system 100 of FIG. 1E, unless noted otherwise herein.

In one embodiment, as shown in FIG. 1E, the system 100 may include one or more identification devices 172 used to obtain biometric data from a user 103 in cases where biometric data is used for authorization credentials. For example, the one or more identification devices 172 may include, but are not limited to, a fingerprint reader for acquiring the fingerprints of the user 103. By way of another example, the one or more identification devices 172 may include, but are not limited to, a camera configured for acquiring one or more eye scans of the user 103, and a camera configured for acquiring one or more facial recognitions scans of the user 103. By way of another example, the one or more identification devices 172 may include, but are not limited to, a camera configured for acquiring data regarding the walking gate of the user 103 for identification via walking gate analysis. By way of another example, the one or more identification devices 172 may include, but are not limited to, a microphone for capturing a voice sample from the user 103 for voice recognition analysis. It is noted herein that the identification device 172 may include one or more devices located on and/or within portable device 106. Alternatively, it is further noted that the identification device 172 may include one or more devices separate from and/or external to portable device 106.

Figure 1F:
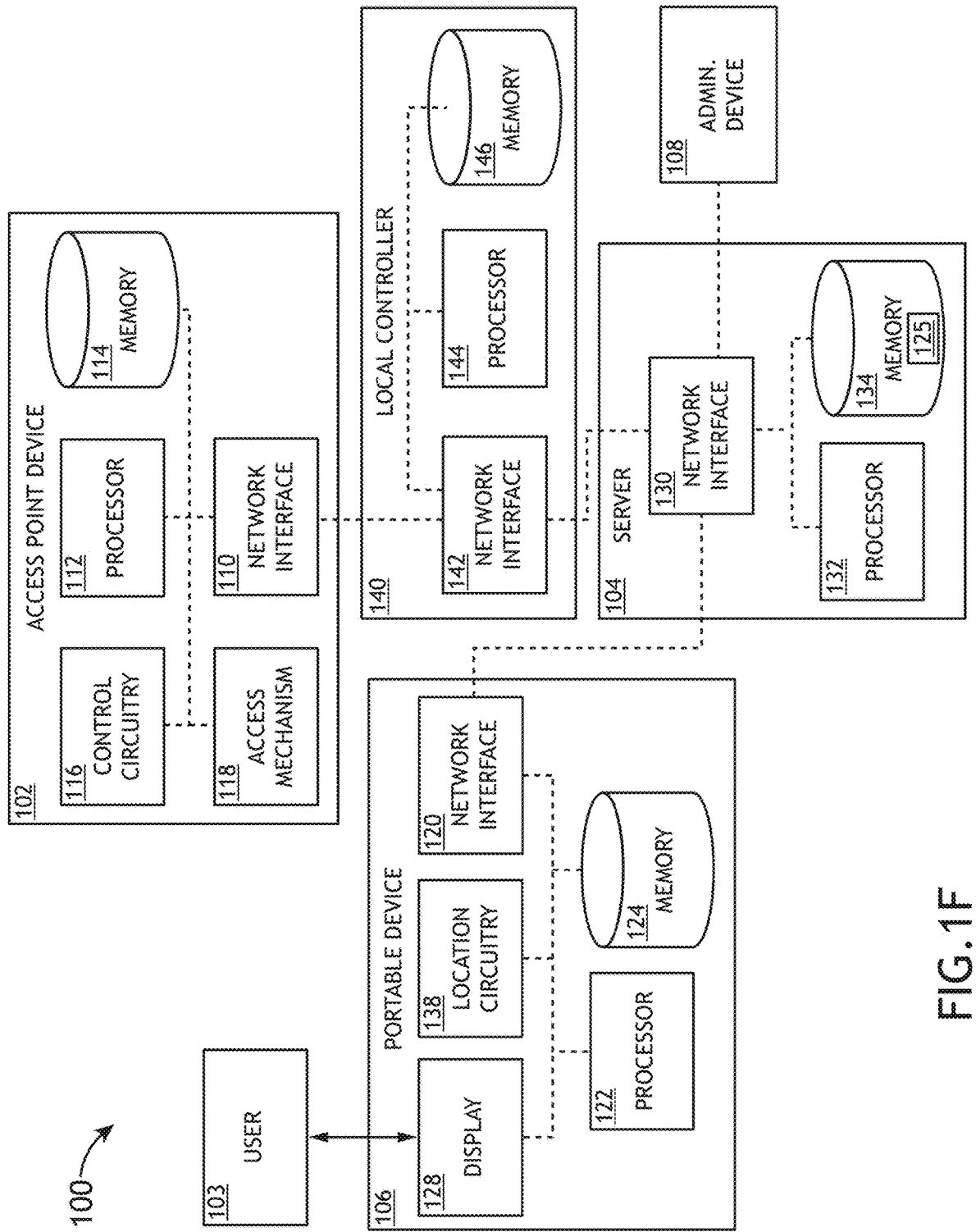

FIG. 1F illustrates a block diagram view of a system 100 for providing location-based access control of a controllable access point, in accordance with one or more embodiments of the present disclosure. It is noted herein that the description associated with systems 100 of FIGS. 1A, 1B, and 1E may be regarded as applying to system 100 of FIG. 1F, unless noted otherwise herein.

In one embodiment, system 100 includes an access point device 102, a server 104, a portable device 106, and a local controller 140. The local controller 140 may include a network interface 142, one or more processors 144, and memory 146. It is contemplated herein that the local controller 140 may include any microprocessor-type device (e.g., desktop computer, mainframe computer system, laptop, smartphone, and the like) configured to control one or more access point devices 102. By way of example, local controller 140 may include a mainframe computer system located in an office and configured to control the one or more entrances to the office via one or more access point devices 102.

In one embodiment, the one or more processors 144 are configured to execute a set of program instructions stored on memory 146, wherein the program instructions cause the one or more processors 144 to carry out one or more steps of the present disclosure. In one embodiment, the one or more processors 144 are configured to cause the network interface 140 to receive one or more signals from server 104. By way of example, the network interface 140 may receive an "unauthorized access" signal from server 104, indicating that a user 103 (e.g., portable device 106) is not authorized to access an access point device 102. By way of another example, the network interface 140 may receive an "authorized access" signal from server 104, indicating that a user 103 (e.g., portable device 106) is authorized to access an access point device 102.

In another embodiment, the one or more processors 144 are configured to cause the network interface 140 to transmit one or more signals from server to network interface 110 of access point device 102 in response to the one or more signals received from server 104. By way of example, if the network interface 140 were to receive an "authorized access" signal from server 104, the one or more processors 144 may be configured to cause the network interface 142 to transmit an "authorized access" signal to network interface 110 of access point device 102.

In one embodiment, the one or more processors 112, 122, 132, 144 may include any one or more processing elements known in the art. In this sense, the one or more processors 112, 122, 132, 144 may include any microprocessor-type device configured to execute software algorithms and/or instructions. In one embodiment, the one or more processors 112, 122, 132, 144 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 112, 122, 132, 144. In general, the term "processor" may be broadly defined to encompass any device having one or more processing elements, which execute program instructions from memory 114, 124, 134, 146. Moreover, different subsystems of the system 100 (e.g., access point device 102, server 104, portable device 106, administrative device 108, access mechanism 118, identification device 172, local controller 140, and the like) may include processor or logic elements suitable for carrying out at least a portion of the steps described throughout the present disclosure. Therefore, the above description should not be interpreted as a limitation on the present disclosure but merely an illustration.

The memory 114, 124, 134, 146 may include any storage medium known in the art suitable for storing program instructions executable by the associated one or more processors 112, 122, 132, 144. For example, the memory 114, 124, 134, 146 may include a non-transitory memory medium. For instance, the memory 114, 124, 134, 146 may include, but is not limited to, a read-only memory (ROM), a random access memory (RAM), a magnetic or optical memory device (e.g., disk), a magnetic tape, a solid state drive and the like. In another embodiment, the memory 114, 124, 134, 146 is configured to store data including, but not limited to, user credentials, geolocation data, GPS data (e.g., location data), time-stamped data, geo-fenced data, and the like. It is further noted that memory 114, 124, 134, 146 may be housed in a common controller housing with the one or more processors 112, 122, 132, 144. In an alternative embodiment, the memory 114, 124, 134, 146 may be located remotely with respect to the physical location of the processors 112, 122, 132, 144. In another embodiment, the memory 114, 124, 134, 146 maintains program instructions for causing the one or more processors 112, 122, 132, 144 to carry out the various steps described through the present disclosure.

Network interfaces 110, 120, 130, 142 of system 100 may include any network interface circuitry or network interface device suitable for interfacing with the various components of system 100. For example, the network interface 110, 120, 130, 142 may include wireline-based interface devices (e.g., DSL-based interconnection, cable-based interconnection, T9-based interconnection, and the like). In another embodiment, the network interface 110, 120, 130, 142 may include a wireless-based interface device employing GSM, GPRS, CDMA, EV-DO, EDGE, WiMAX, 3G, 4G, 4G LTE, 5G, WiFi protocols, RF, LoRa, and the like. By way of another example, network interface 110, 120, 130, 142 may include any network interface circuitry configured to interface with a cloud-based architecture.

In another embodiment, the portable device 106 includes a display 128 used to display data of the system 100 to a user 103. The display 128 of the portable device 106 may include any display known in the art. For example, the display 128 may include, but is not limited to, a liquid crystal display (LCD), an organic light-emitting diode (OLED) based display, or a CRT display. Those skilled in the art should recognize that any display device capable of integration with a portable device 106 is suitable for implementation in the present disclosure. In another embodiment, a user may input selections and/or instructions responsive to data displayed to the user via the display 128.

Figure 2:
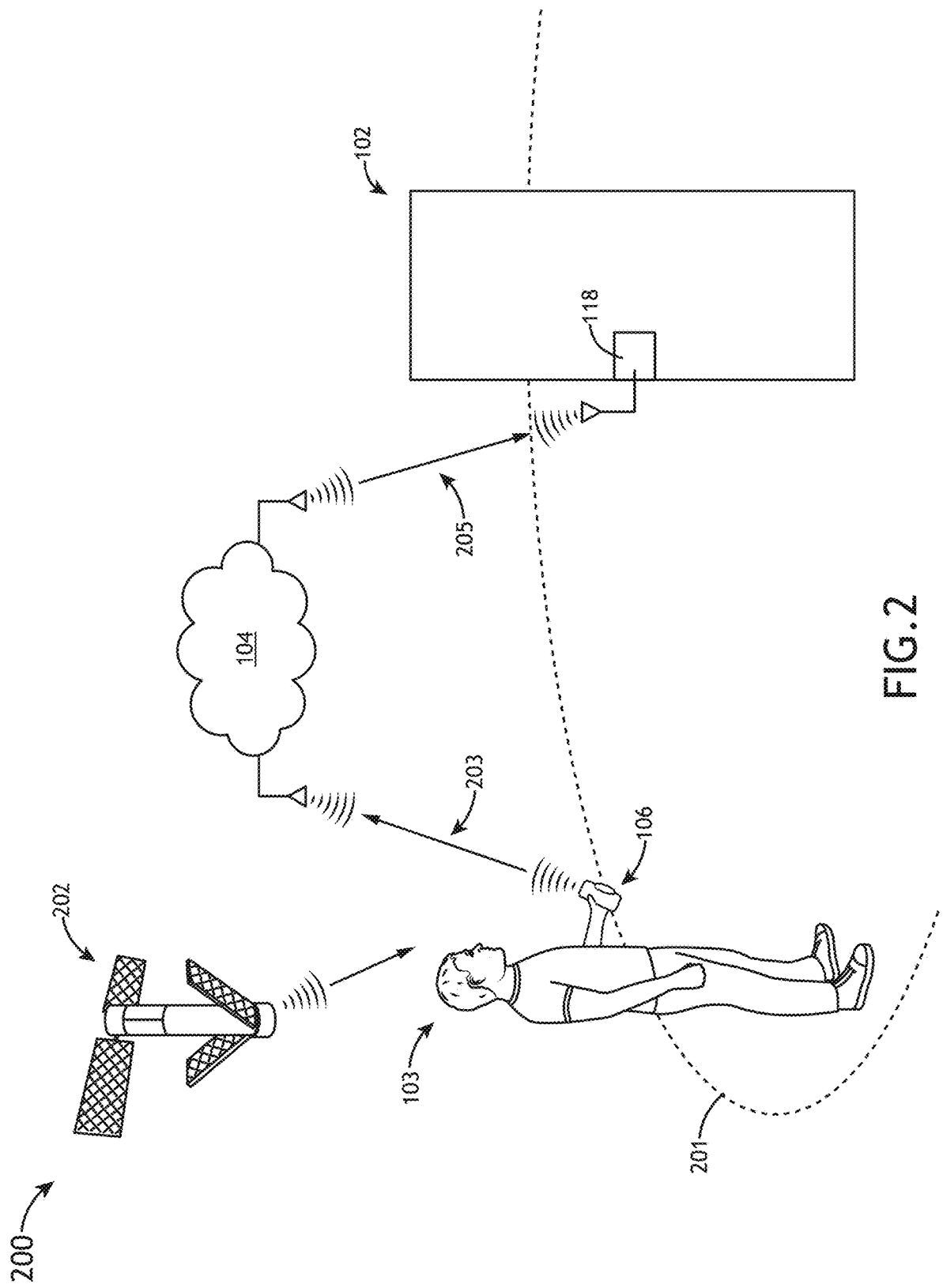
FIG. 2 illustrates a conceptual view of the operation of a system for providing location-based access control, in accordance with one or more embodiments of the present disclosure.

FIG. 2 illustrates a conceptual view 200 of the operation of the system 100, in accordance with one or more embodiments of the present disclosure.

As shown in FIG. 2, when a user 103 carrying a portable device 106 approaches an access point device 102 (e.g., controllable door with electronic door lock) the portable device 106 receives location information from location services 202 via location circuitry 138. Location services 202 may include, but are not limited to, GPS services, as depicted in FIG. 2. In one embodiment, once the location of portable device 106 is known, the location information is then transmitted via a request for access signal 203 to the server 104 maintained in the cloud (e.g., cloud server). Prior to, subsequent to, or simultaneous to the transmission of the location information, the portable device 106 may also transmit credential information entered into the portable device 106. The credential information may include, but is not limited to, a password, a pin, fingerprint information entered via a fingerprint reader of the portable device 106, an eye/retinal scan obtained via a camera of the portable device 106, facial recognition data obtained via a camera of the portable device 106, voice recognition information obtained with a microphone of the portable device 106, or some combination thereof. The server 104 may then determine if the user 103 (e.g., portable device 106) is within a pre-defined distance or area 201. Provided the one or more credentials meet the requirements stored in the server 104 and the portable device 106 is with the pre-defined distance/area 201, the server 104 may then transmit authorized access signals 205 to the given access point device 102. For example, as shown in FIG. 2, in the case where the access point device 102 is an electronically lockable doorway, the server 104 may transmit an authorized access signal 205 (e.g., an "unlock" signal) to access point device 102, wherein the access mechanism 118 may unlock the doorway. By way of another example, if either portable device 106 credential information and/or the location of portable device 106 indicates that the user 103 (e.g., portable device 106) is not authorized to access the access point 102, the user 103 may be denied access to the access point 102. Denying access to an access point may be carried out by the server declining to transmit an authorized access signal 205, or, alternatively, by the server transmitting an unauthorized access signal.

As noted previously herein, it is again noted that the credential verification process and the location verification process need not be executed on the server 104. Rather, one or both of the verification process and the location verification process may be executed on the portable device 106 itself. In this case, the portable device 106 may transmit the results of the verification processes to the server 104, which may then relay the pertinent command (e.g., authorized access or unauthorized access) to the given access point device 102.

Figure 3:
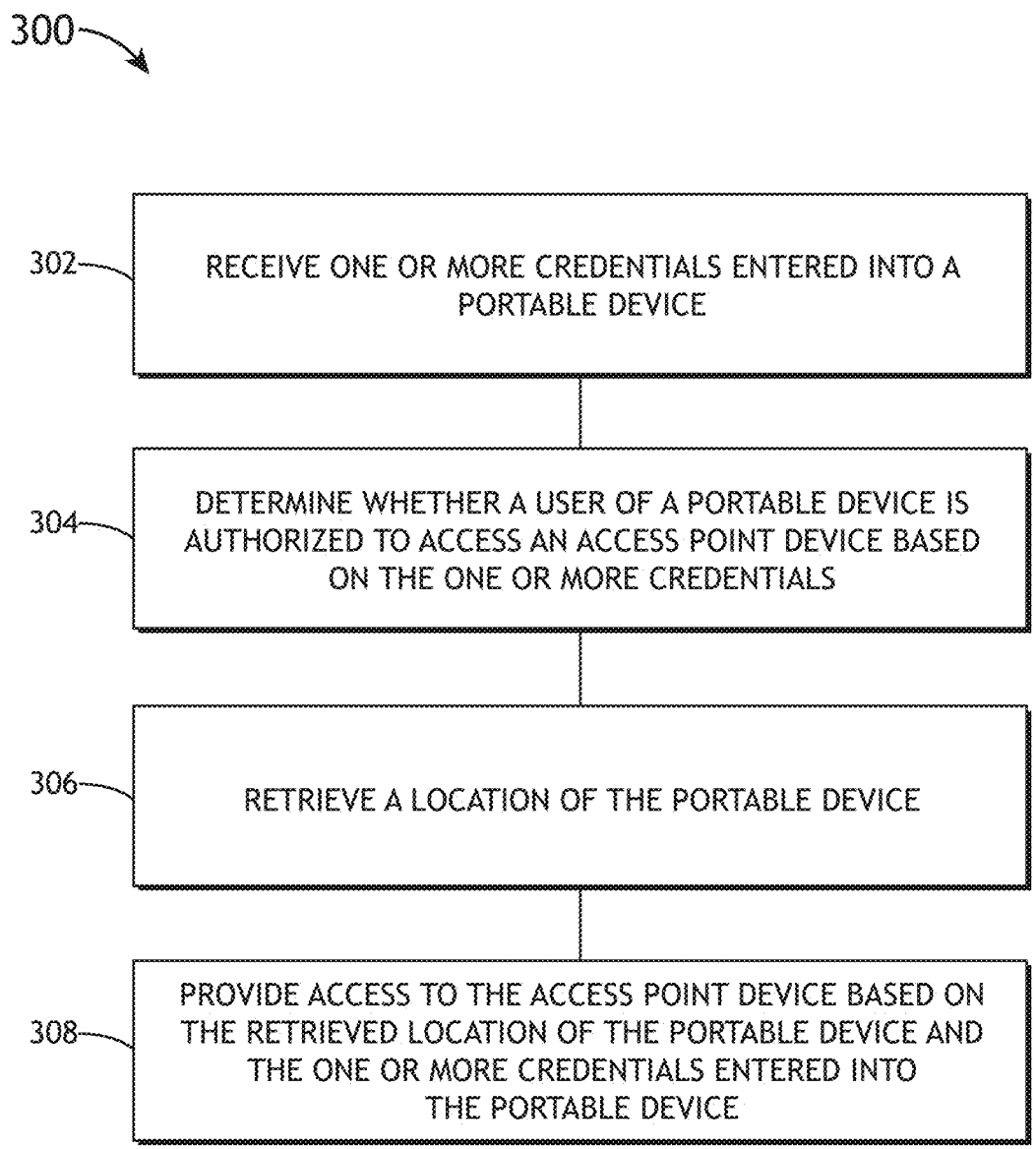
FIG. 3 illustrates a process flow diagram depicting a method of providing location-based access control, in accordance with one or more embodiments of the present disclosure.

FIG. 3 illustrates a process flow diagram depicting a method 300 of location-based access control, in accordance with one or more embodiments of the present disclosure.

In step 302, one or more credentials entered into a portable device are received. For example, the one or more credentials (e.g., username/password, PIN, fingerprint, eye scan, face scan, and the like) are entered into the portable device 106 by the user 103. The portable device 106 then transmits the one or more credentials to the server 104.

In step 304, it is determined whether the user of the portable device is authorized to access the access point device based on the one or more credentials. In one embodiment, the server 104 may compare the one or more received credentials to the access database 125 maintained in memory 124, which contains a correlated listing of user IDs and access levels, to determine if the received credentials correspond to the access requested by the user 103. If the received credentials do not give the user 103 authorization to access the access point device 102, the user 103 is denied access. In the case where credentials provide the user 103 with authorization to access the given access point device 102, then the method moves to step 306.

In step 306, a location of the portable device is retrieved. For example, the server 104 may request a location from the portable device 106, and the portable device 106 may transmit the location of the portable device 106 to the server 104. Alternatively, the portable device 106 may transmit the location of the portable device 106 to the server 104 without receipt of a location request.

In step 308, access to the access point device 102 is provided based on the retrieved location of step 306 and the one or more credentials entered in step 302. In one embodiment, the server 104 determines whether the location of the portable device 106 is within a pre-defined distance or area (e.g., a pre-defined geographical fence). Then, upon determination of user 103 authorization to the access point device 102 and that the location of the portable device 106 is within the pre-defined distance or area 201, the server 104 directs the access mechanism 118 of the access point device 102 to provide access to the user 103.

Figure 4:
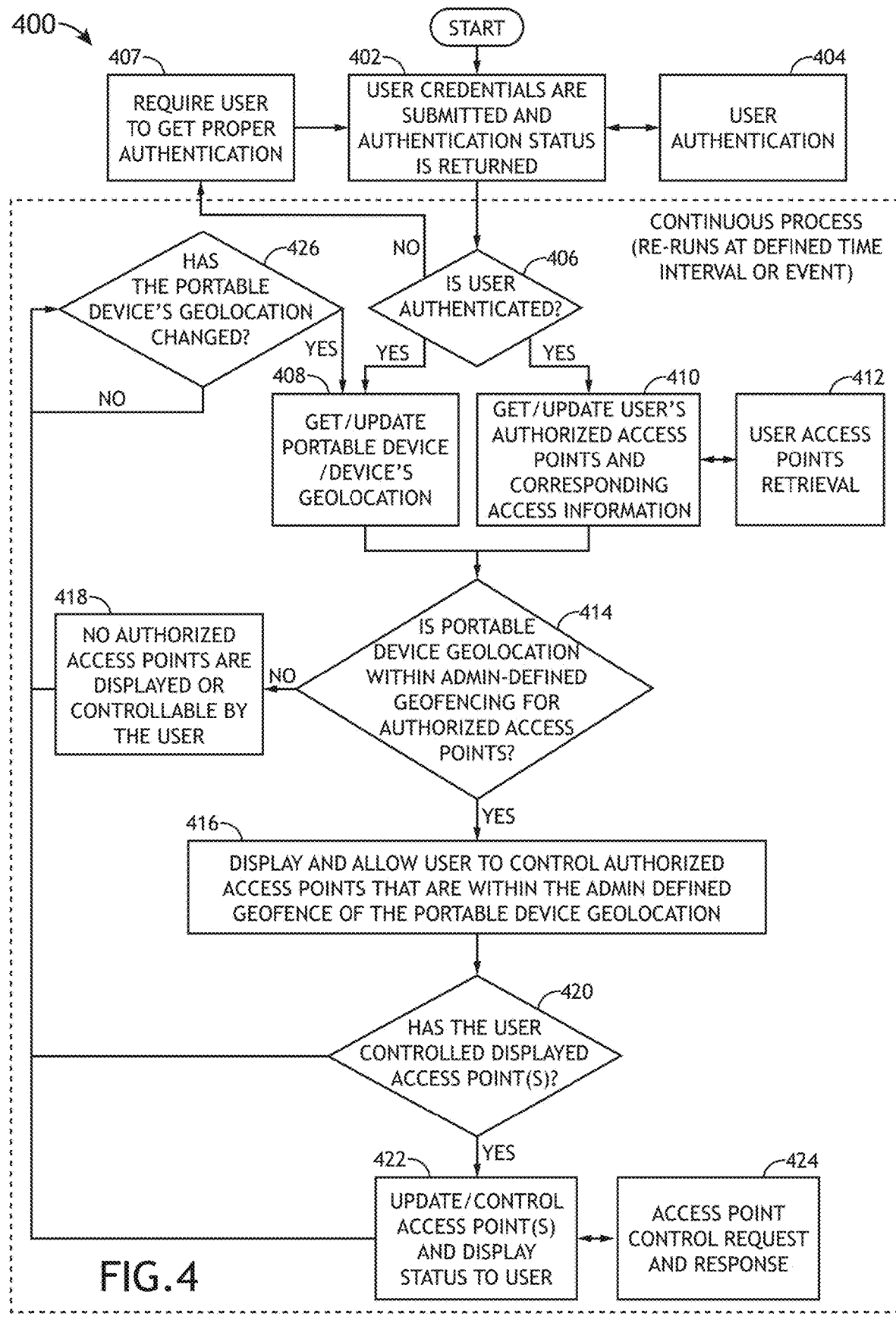
FIG. 4 illustrates a process flow diagram depicting a method of providing location-based access control, in accordance with one or more embodiments of the present disclosure.

FIG. 4 illustrates a process flow diagram depicting the method 400 of the location-based access control, in accordance with one or more embodiments of the present disclosure. FIGS. 5-13B illustrate a set of user interfaces of a display 128 of a portable device 106 for providing location-based access control, in accordance with one or more embodiments of the present disclosure.

Referring generally to FIG. 4 and to FIGS. 5-13B, a method 400 of the location-based access control is described along with corresponding user interfaces, in accordance with one or more embodiments of the present disclosure. It is noted herein that the user interfaces depicted in FIGS. 5-13B are exemplary only. User interfaces shown and described are provided solely for illustrative purposes and to provide the reader with a more thorough understanding of the inventive concepts of the present disclosure. Therefore, the user interfaces depicted in FIGS. 5-13B are not to be regarded as limiting, and additional and/or alternative user interfaces may be used without departing from the spirit or scope of the present disclosure.

Figure 5:
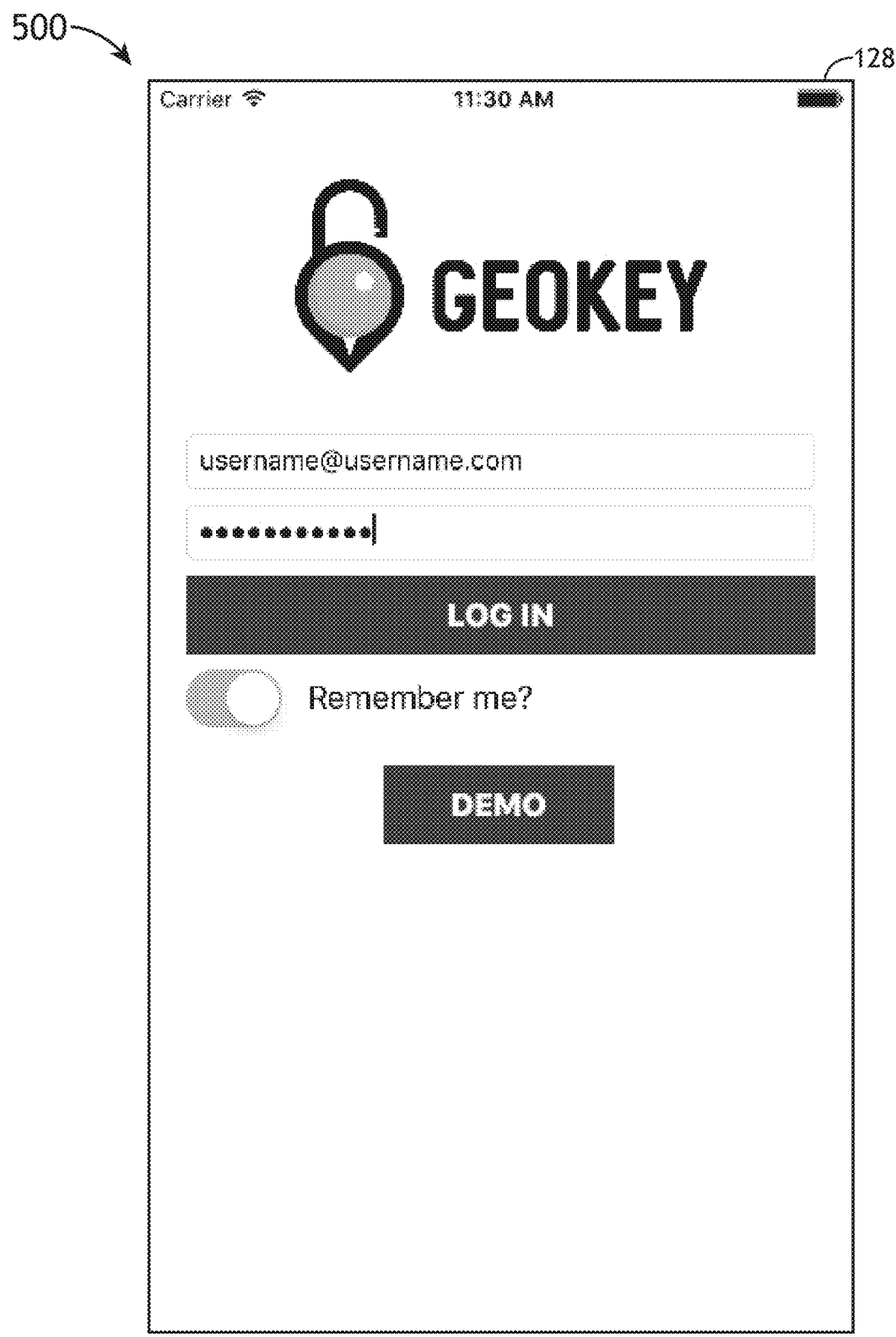
FIGS. 5-13B illustrate a set of user interfaces of a portable device for providing location-based access control, in accordance with one or more embodiments of the present disclosure.

In step 402, user credentials are submitted, and an authentication status is returned. For example, a user 103 may enter one or more credentials (e.g., a username/password, PIN, fingerprint, eye scan, face scan, and the like) into a portable device 106. For instance, FIG. 5 illustrates a user interface 500 of a display 128 of a portable device 106, in accordance with one or more embodiments of the present disclosure. As shown in user interface 500, a user 103 may submit user credentials in a username/password format.

In step 404, the user is authenticated. Authenticating the user 103 (e.g., received user credentials) may be carried out by any steps or methods known in the art. For example, the server 104 may compare the one or more user credentials to the access database 125 maintained in memory 124, which contains a correlated listing of user IDs and access levels, to determine if the received credentials correspond to the access requested by the user 103. For instance, in the case where user credentials are provided in username/password format, as depicted in FIG. 5, the server 104 may compare the received username/password to the access database 125 maintained in memory 124, which contains a listing of user IDs by username and password to determine if the received username and password are authorized for the access requested. By way of another example, the user 103 may be authenticated by an application programming interface (API). By way of another example, a user may be authenticated in step 404 simply by obtaining access to the portable device 106.

In step 406, it is determined whether the user is authenticated. In one embodiment, if the user 103 was properly authenticated in step 404, method 400 proceeds to steps 408 and 410. In another embodiment, if the user 103 was not properly authenticated in step 404, method 400 proceeds to step 407. In step 407, if the user is not authenticated, the user is required to get proper authentication. In one embodiment, if a user 103 lacks proper authentication, the user 103 may then be required to obtain proper user credentials in order to receive proper authentication. In one embodiment, after a user 103 has received proper credentials, the user 103 may then submit their user credentials in step 402.

In another embodiment, if the user 103 was properly authenticated in step 406, method 400 proceeds to steps 408 and 410.

In step 408, the geolocation of the portable device is obtained and/or updated. In one embodiment, the server 104 may be configured to retrieve a geolocation of the portable device 106. In another embodiment, the portable device 106 may acquire its geolocation via one or more location services and on-board location circuitry 126,138 (e.g., GPS services and/or WiFi location services) and then transmit that geolocation information to the server 104.

In step 410, the user's authorized access points and corresponding access point information is obtained and/or updated. In step 412, the user's access points are retrieved. In one embodiment, an application programming interface (API) may retrieve access point information in step 412. For example, an API may process the user credentials submitted in step 402 and retrieve the user's access points and corresponding access point information (e.g., the access point's "geofence," and the like) from database 125 of server 104. In another embodiment, once the authorized access points and corresponding access point information of a user 103 are obtained in steps 410 and 412, the obtained information is transmitted to the portable device 106.

In step 414, it is determined whether the geolocation of the portable device is within administrator-defined geofencing for authorized access points. As noted previously herein, administrator-defined geofencing may include, but is not limited to, a pre-defined distance (e.g., radius) around an access point, a pre-defined area proximate to an access point, or the like. In one embodiment, server 104 uses the determined location of the portable device 106 to determine whether the portable device 106 is within an administrator-defined geofencing of an authorized access point. In another embodiment, server 104 uses geospatial equations and/or algorithms to determine whether a user 103 (e.g., portable device 106) is within an administrator-defined geofencing.

It is noted herein that access to a given access point, as shown in FIG. 4, may be determined based on user credentials and geolocation. It is further noted, however, that access to a given access point may be based on additional and/or alternative parameters. By way of an example, access to a given access point may be determined solely by user credentials. In this example, method 400 may proceed from step 406 directly to step 416. By way of another example, in addition to user credentials and geolocation, access to a given access point may be based on one or more additional parameters including, but not limited to, time. For instance, a user authorized to access an access point may only be authorized to access that access point between the hours of 8 a.m. and 5 p.m.

If the geolocation of the portable device 106 is not within an administrator-defined geofencing for an authorized access point, method 400 proceeds to step 418. In step 418, no authorized access points are displayed or controllable by the user. For example, if a user 103 was authorized to access two separate access points, but was not within the administrator-defined geofencing of either access point, no access points would be displayed to the user 103, and no access points would be controllable by the user 103.

Figure 10:
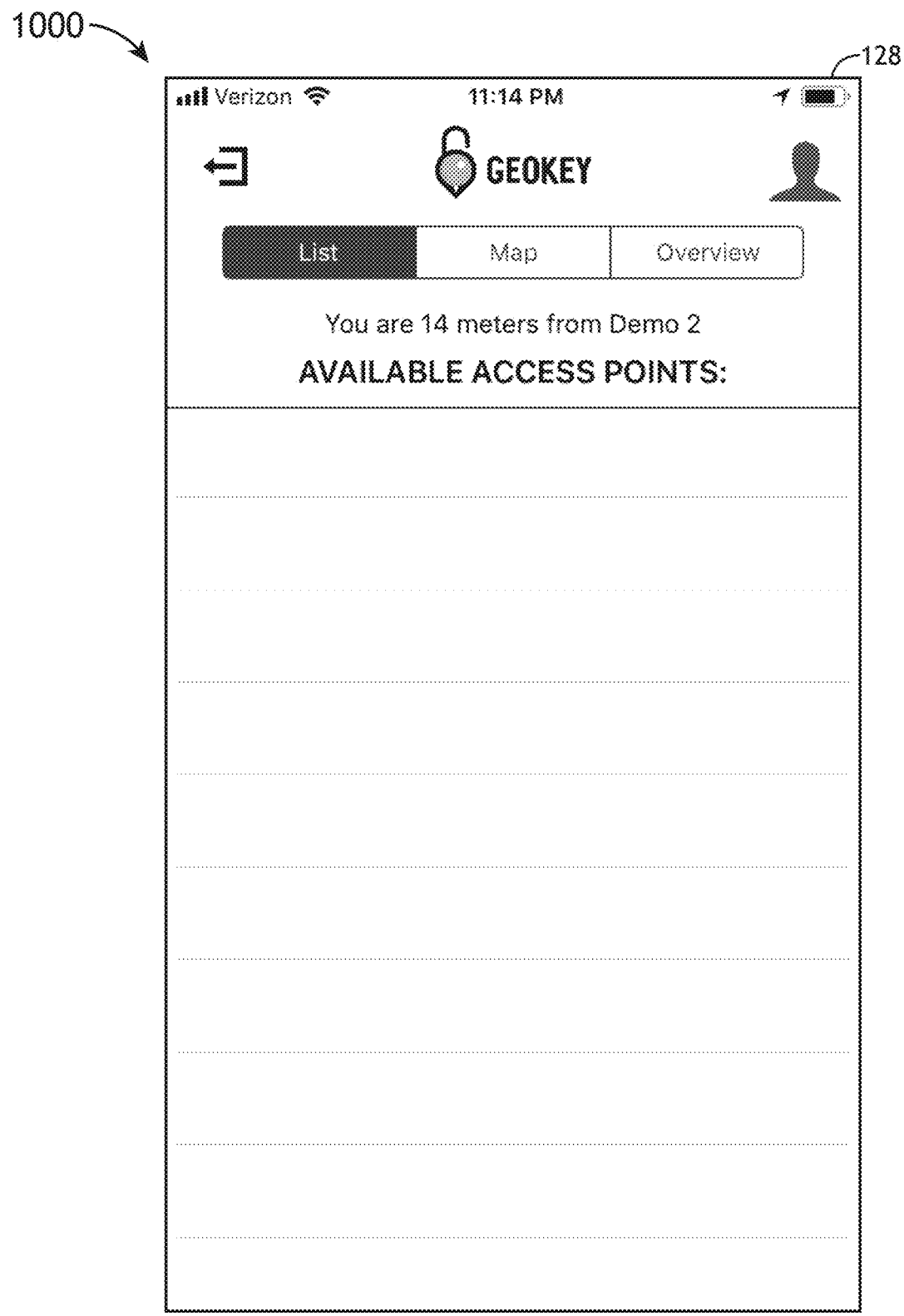
Figure 11:
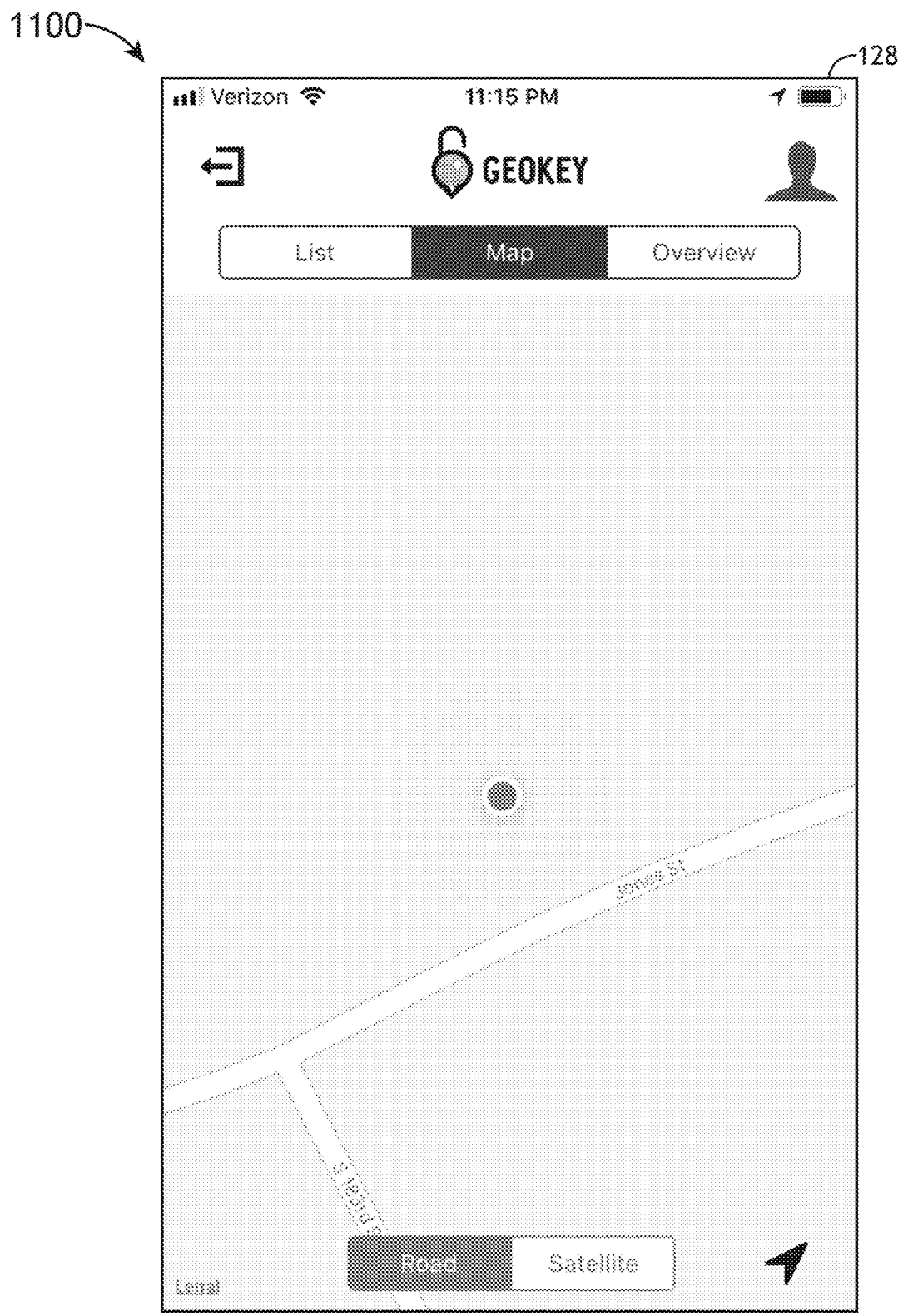

FIGS. 10 and 11 illustrate user interfaces 1000, 1100 of a display 128 of a portable device 106 in which no authorized access points are displayed or controllable by the user. As can be seen in FIGS. 10 and 11, the user is not within the administrator-defined geofencing of an access points. As such, user interfaces 1000, 1100 do not list or display any available access points.

Following step 418, method 400 proceeds to step 426 and the portable device 106 may continue to display no available access points. In step 426, it is determined whether the geolocation of the portable device has changed. If the geolocation of the portable device 106 has not changed, the portable device 106 may continue to display no available access points, and method 400 may repeat step 426 until the geolocation of the portable device 106 has changed. If it is determined that the geolocation of the portable device 106 has changed, method 400 proceeds to step 408.

Returning to step 414, if it is determined that the portable device is within an administrator-defined geofencing for one or more authorized access points, method 400 proceeds to step 416.

In step 416, available access points are displayed to the user, and the user is allowed to control the available access points. In one embodiment, the term "available" may denote that a user is both authorized to access to a given access point and is within the administrator-defined geofencing of the access point. For example, if a user 103 was authorized to access three separate access points, but was only within the administrator-defined geofencing of two of the access points, the user 103 would have two "available" access points. In this example, the portable device 106 would display the two available access points, and the user 103 would be allowed to control the two available access points. By way of another example, if a user 103 had access to three separate access points, and was within the administrator-defined geofencing of all three access points, the user would have three available access points, and the three available access points may be displayed to the user 103.

Figure 6:
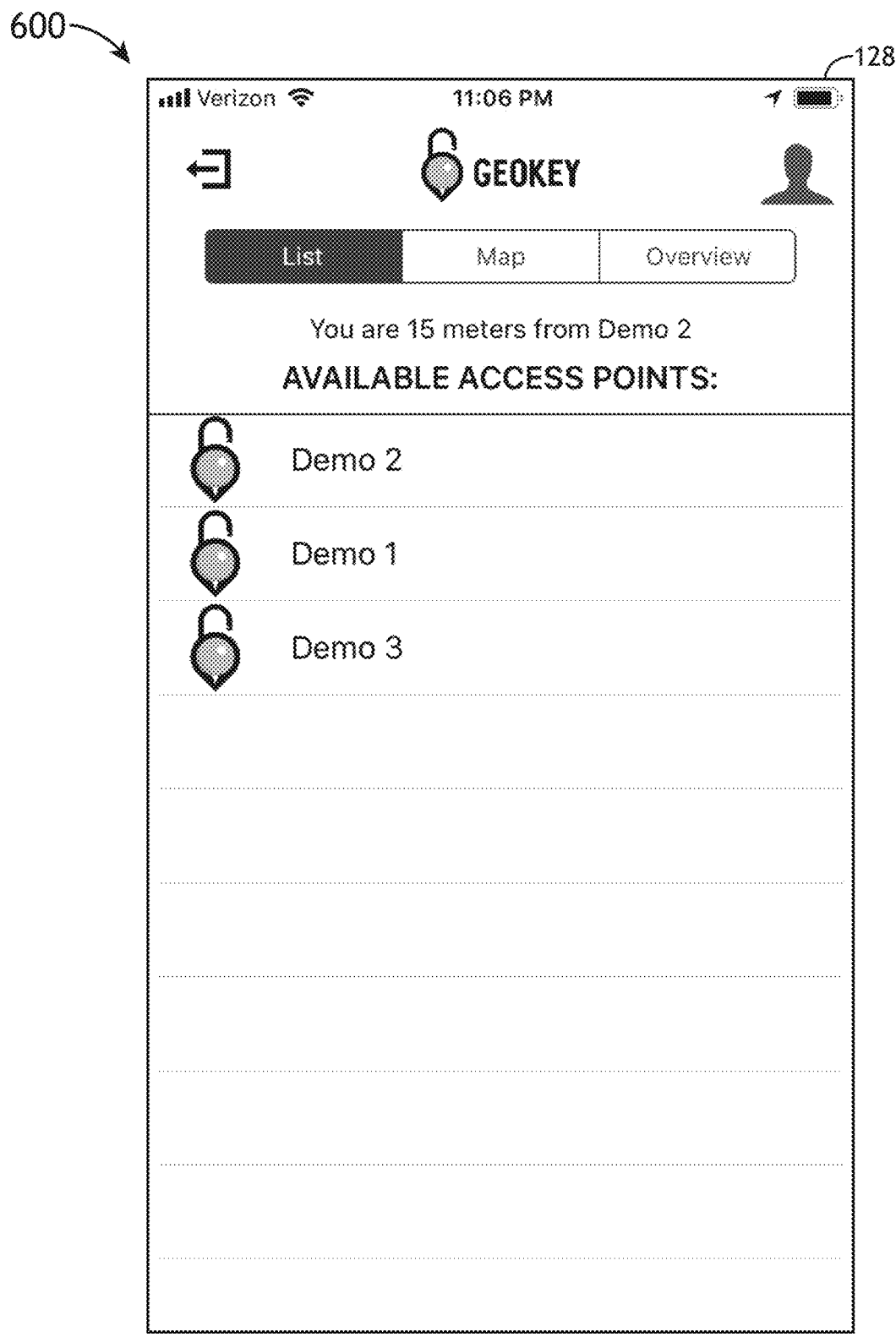
Figure 7:
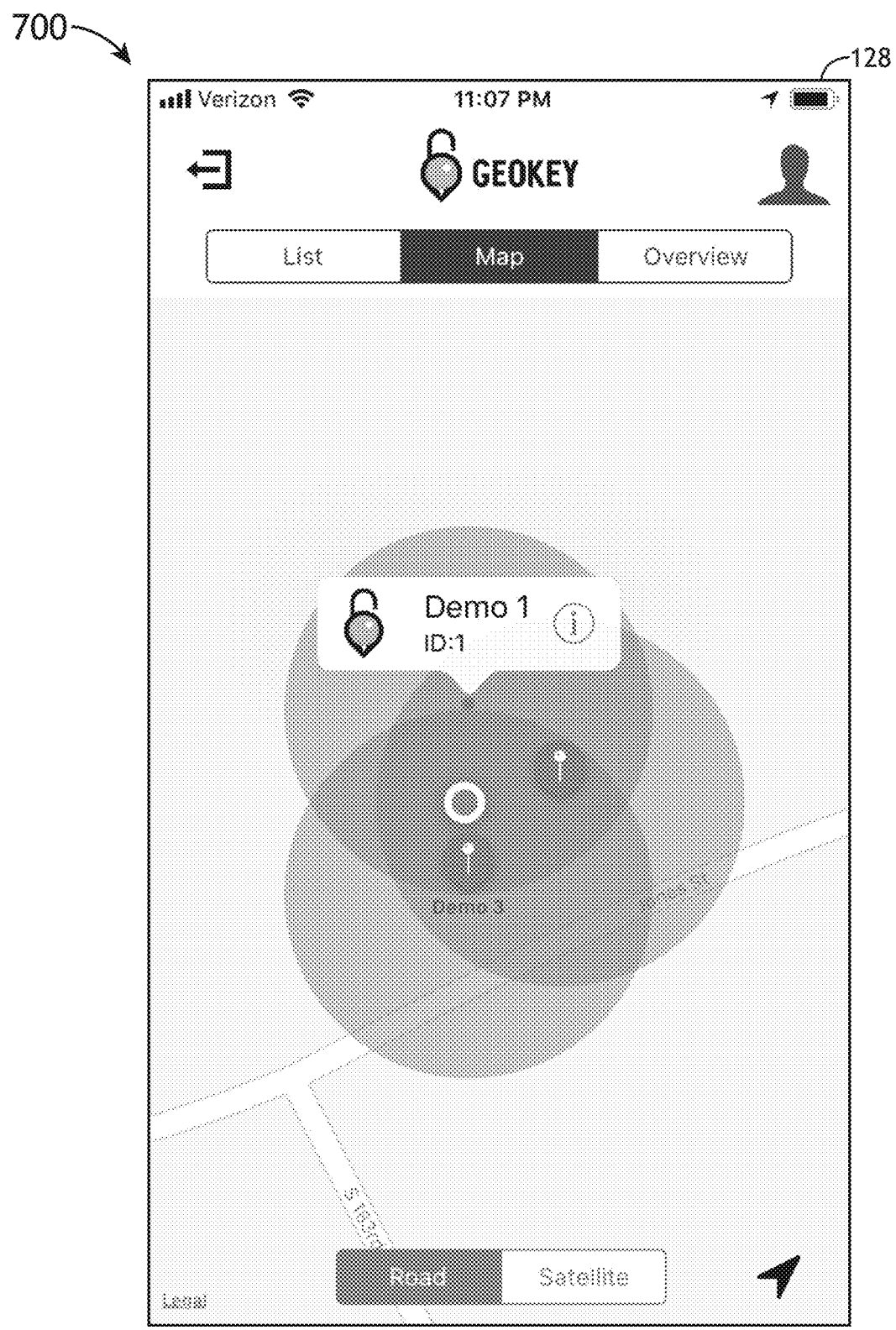

FIGS. 6 and 7 illustrate user interfaces 600, 700 of a display 128 of a portable device 106 which display available access points to a user 103, in accordance with one or more embodiments of the present disclosure. As shown in FIGS. 6 and 7, the user 103 has three available access points. In one embodiment, user interface 600 displays the available access points to the user 103 via a list. In another embodiment, user interface 700 displays the available access points to the user 103 via a map. In another embodiment, a user 103 may be able to toggle between a list view and a map view, as shown in FIGS. 6 and 7. In another embodiment, user interfaces 600, 700 display the current location of the user 103 via latitude/longitude coordinates. In another embodiment, user interfaces 600, 700 display the distance between the user 103 and the nearest available access point.

Figure 8:
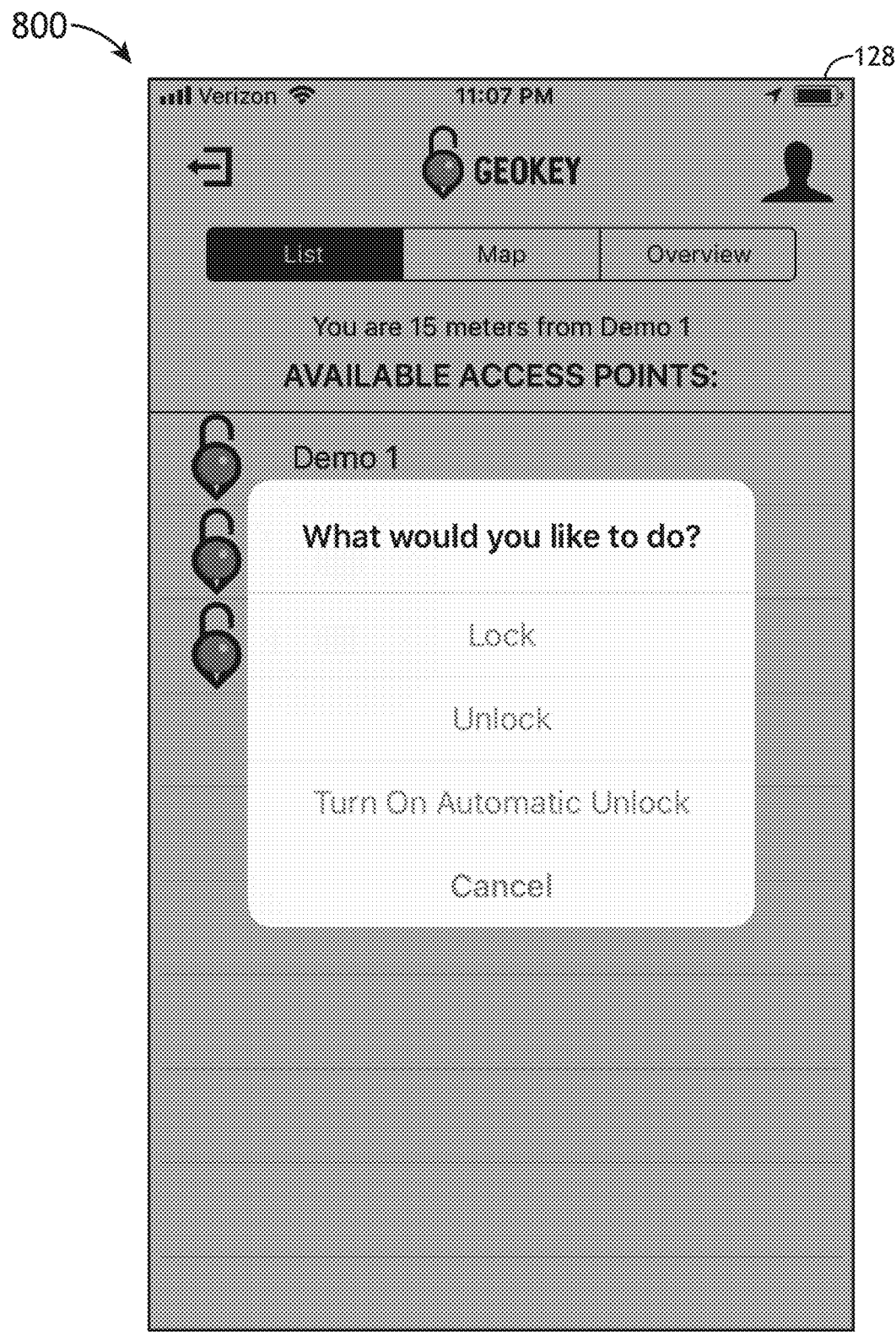
Figure 9:
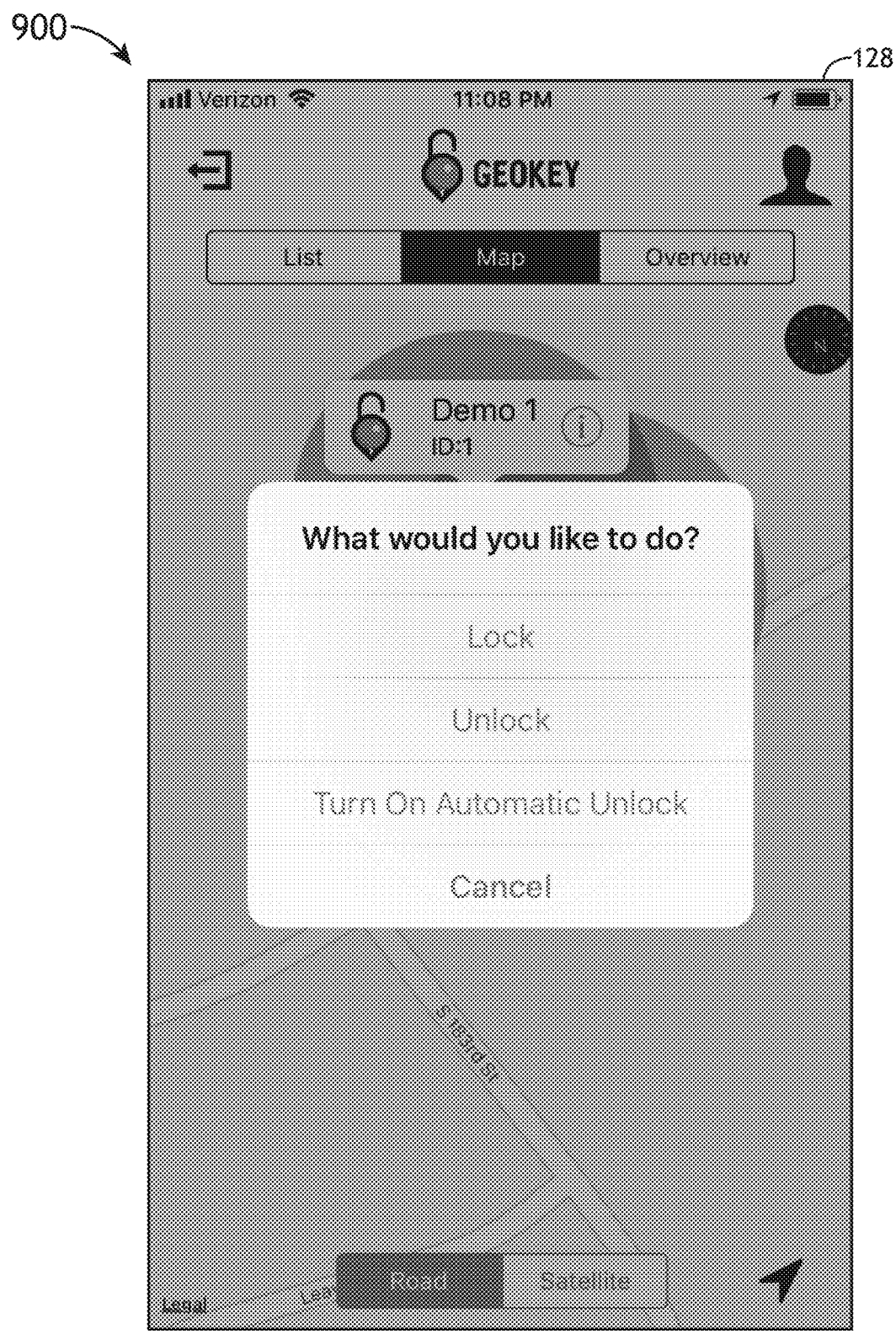

FIGS. 8 and 9 illustrate user interfaces 800, 900 of a display 128 of a portable device 106 which allow the user 103 to control available access points, in accordance with one or more embodiments of the present disclosure. For example, as shown in FIGS. 8 and 9, if a user 103 were to select an available access point which was a door, the user 103 may be able to control the door by locking, unlocking, turning on an automatic lock, turning off an automatic lock, and the like. It is noted herein that the options by which to control an access point may vary depending on the available access point selected. For example, if the available access point selected were a car, a user 103 may be presented different control options including, but not limited to, unlocking the car, locking the car, starting the car, and the like. It is further noted that the controlling options and capabilities are not limited to those pictured and described, and that additional and/or alternative controlling options may be implemented without departing from the spirit or scope of the present disclosure.

In step 420, it is determined whether the user has controlled one or more displayed access points. The term "controlled," as used in the present disclosure, may indicate that a user has selected one or more control options of an access point, thereby requesting to control one or more characteristics of the access point. For example, a user 103 may be said to have "controlled" an access point which is a door if the user selected to lock the door, as depicted in FIGS. 8 and 9.

If it is determined that the user 103 has not controlled one or more displayed access points, method 400 proceeds to step 426 and the portable device 106 may continue to display available access points. In step 426, it is determined whether the geolocation of the portable device has changed. If the geolocation of the portable device 106 has not changed, the portable device 106 may continue to display available access points, and step 426 may be repeated until the geolocation of the portable device 106 has changed. If it is determined that the geolocation of the portable device 106 has changed, method 400 proceeds to step 408.

Returning to step 420, if it is determined that the user 103 has controlled one or more displayed access points, method 400 proceeds to step 422. In step 422, one or more access points are updated and/or controlled, and the status is displayed to the user. In step 424, a response to the access point control request is made. In one embodiment, the response to the access point control request is made by an application programming interface (API). A more detailed description of the control access request process and corresponding response processes may be found herein in conjunction with FIG. 14.

By way of an example, if a user 103 requested to control an access point by unlocking a door, the door would be unlocked and the status of "unlocked" would be displayed to the user 103. By way of another example, if a user 103 requested to control an access point by locking a door, the door would be locked and the status of "locked" would be displayed to the user 103.

Figure 12A:
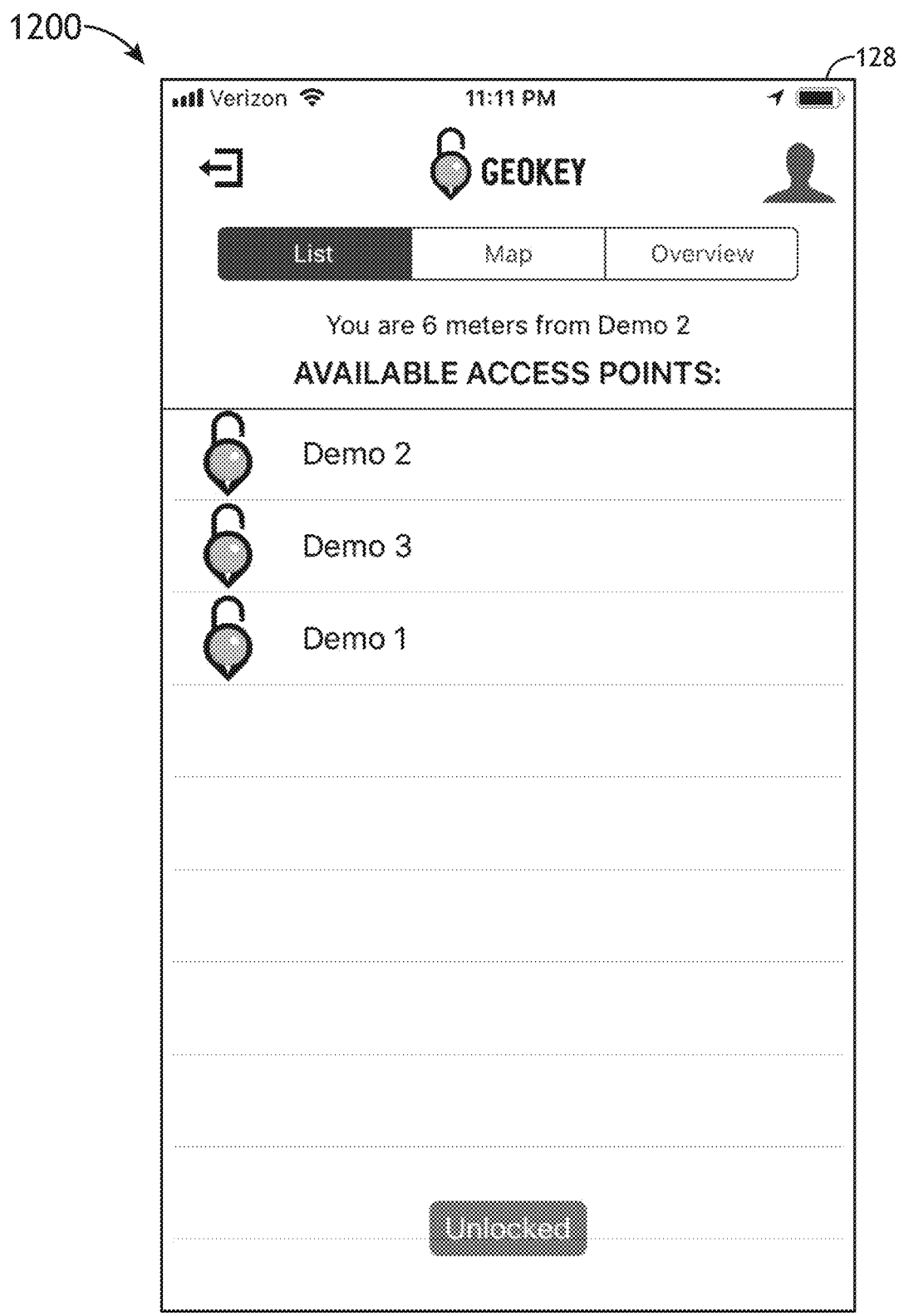
Figure 12B:
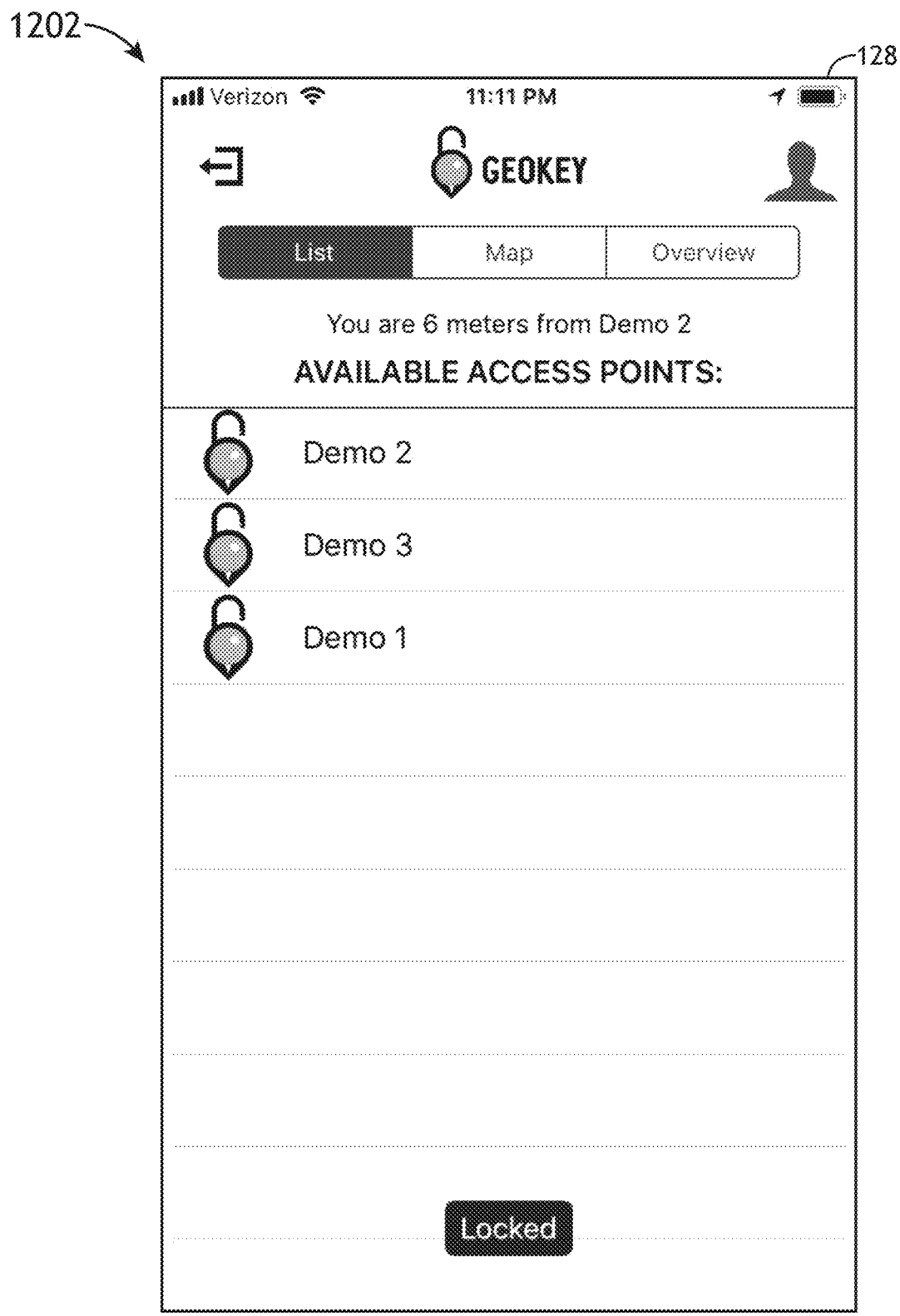
Figure 13A:
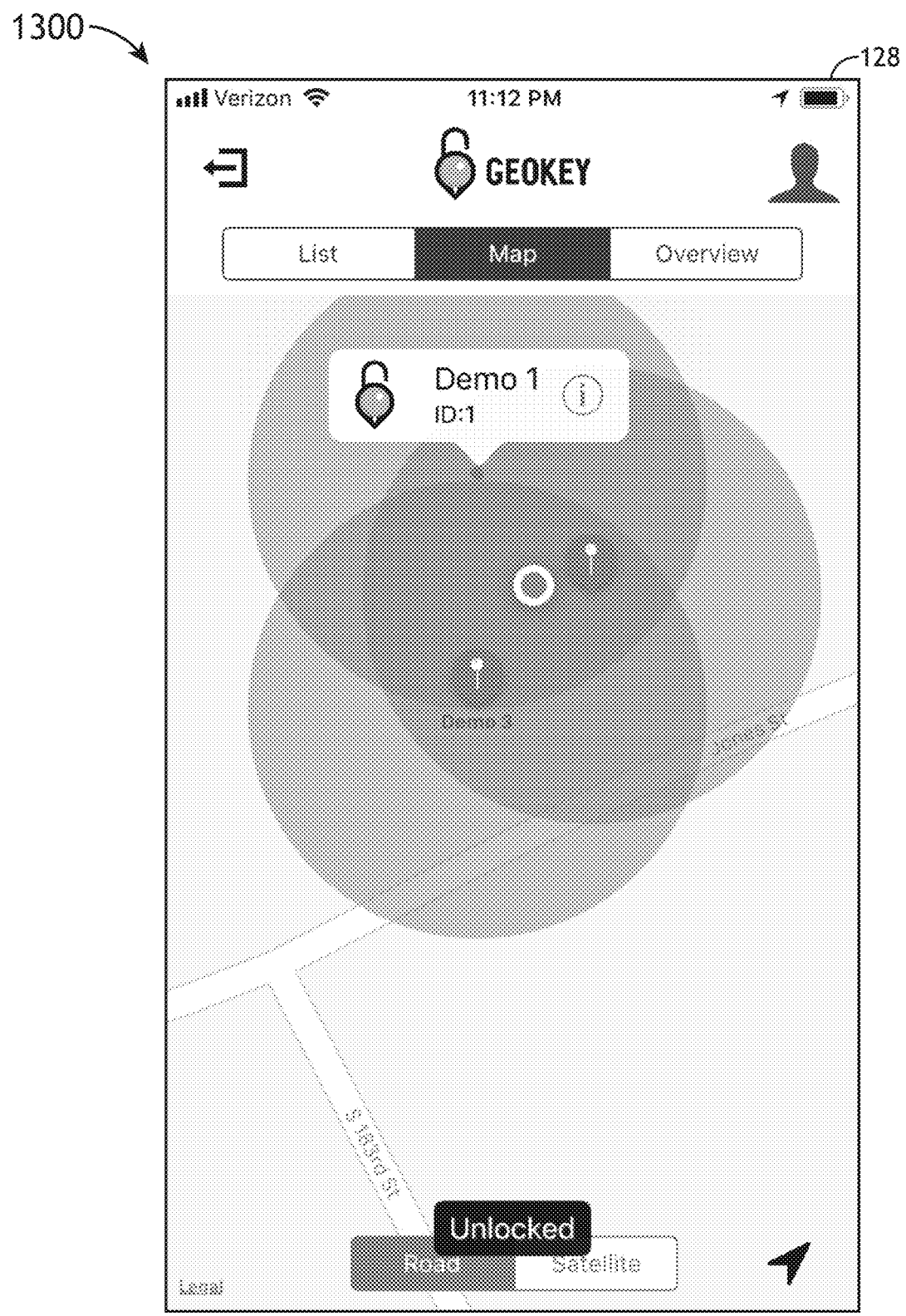
Figure 13B:
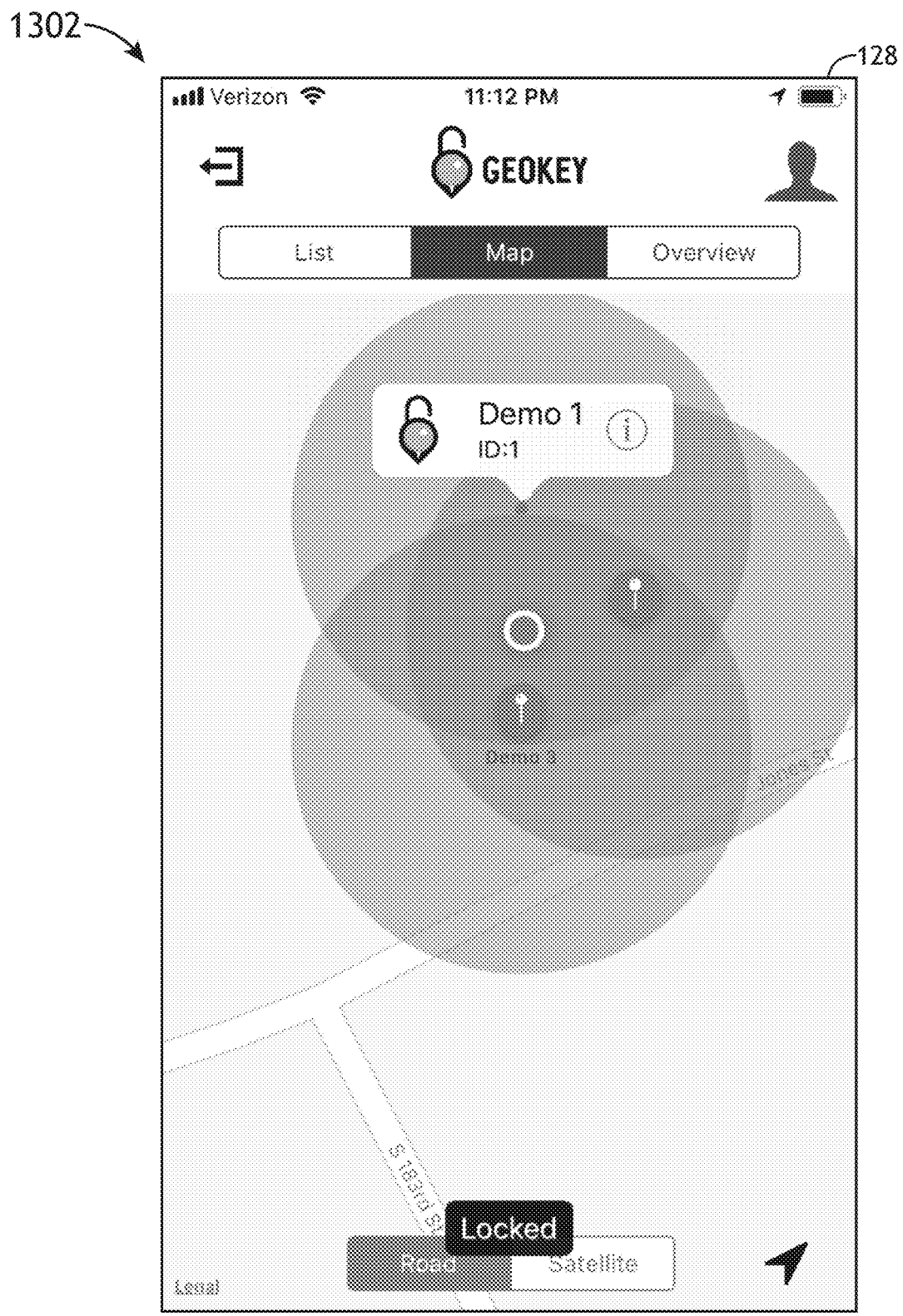

For instance, FIGS. 12A, 12B, 13A, and 13B illustrate user interfaces 1201, 1202, 1301, and 1302 of a display 128 of a portable device 106 which display the status of a controlled access point to a user 103. If a user 103 had unlocked an access point, the response to the access point control request may be carried out (e.g., the door may be unlocked) and the status of "unlocked" may be displayed to the user 103, as shown in FIGS. 12A and 13A. Similarly, if a user 103 had locked an access point, the response to the access point control request may be carried out (e.g., the door may be locked) and the status of "locked" may be displayed to the user 103, as shown in FIGS. 12B and 13B.

Following steps 422 and 424, method 400 proceeds to step 426. In step 426, it is determined whether the geolocation of the portable device has changed. If the geolocation of the portable device 106 has not changed, the portable device 106 may continue to display available access points and the status of controlled access points, and step 426 may be repeated until the geolocation of the portable device 106 has changed. If it is determined that the geolocation of the portable device 106 has changed, method 400 proceeds to step 408.

Figure 14:
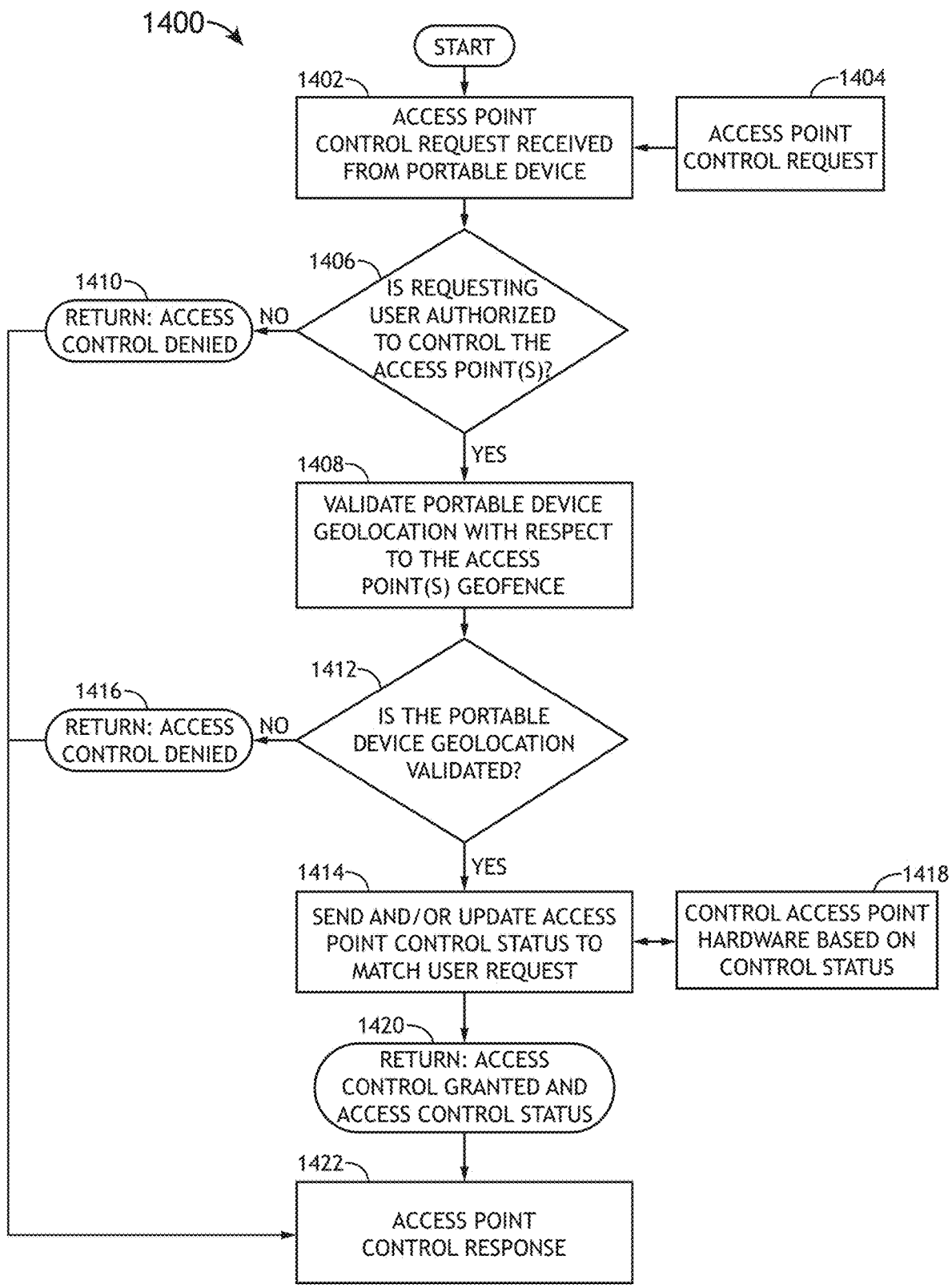
FIG. 14 illustrates a process flow diagram depicting a method of providing location-based access control, in accordance with one or more embodiments of the present disclosure.

FIG. 14 illustrates a process flow diagram depicting a method 1400 for providing location-based access control, in accordance with one or more embodiments of the present disclosure.

In step 1402, an access point control request is received from a portable device. In step 1404, the access point control request is processed. Access point control requests may include any request to control one or more characteristics of an access point including, but not limited to, requesting to unlock a door, requesting to lock a door, requesting access to a file, requesting to start a car, requesting to distribute an item from a vending machine, and the like. In one embodiment, an access control request may include user information and portable device 106 information including, but not limited to, user credentials, geolocation, and the like. In another embodiment, the information received along with an access control request (e.g., user credentials, geolocation, and the like) may be used to validate the request and grant/deny the access control request. In another embodiment, access point control requests may be processed by an application programming interface (API).

In step 1406, it is determined whether the requesting user is authorized to control the requested access point(s). Determining whether the user 103 is authorized to control the requested access point(s) may be carried out by any steps or methods known in the art. For example, the server 104 may compare the one or more user credentials to the access database 125 maintained in memory 124, which contains a correlated listing of user IDs and access levels, to determine if the received user credentials correspond to the access requested by the user 103. For instance, in the case where user credentials are provided in username/password format, as depicted in FIG. 5, the server 104 may compare the received username/password to the access database 125 maintained in memory 124, which contains a listing of user IDs by username and password to determine if the received username and password are authorized for the access requested.

If it is determined that the requesting user is not authorized to control the access point(s) in step 1406, method 1400 proceeds to step 1410. In step 1410, the access point control request is denied. In one embodiment, the denial of the access point control request is returned and displayed to the user 103 via the display 128 of the portable device 106.

If it is determined that the requesting user is authorized to control the access point(s) in step 1406, method 1400 proceeds to step 1408. In step 1408, the portable device geolocation with respect to the access point(s) geofence is validated. In one embodiment, validating the geolocation of the portable device 106 includes determining the location of the portable device 106. In another embodiment, validating the geolocation of the portable device 106 includes determining whether the portable device 106 is within the administrator-defined geofencing of the requested access point(s). In one embodiment, validating the geolocation of the portable device 106 is carried out by geospatial equations and/or algorithms.

In step 1412, it is determined if the geolocation of the portable device was validated in step 1408. If the geolocation of the portable device was not validated in step 1408, method 1400 proceeds to step 1416. In step 1416, the access point control request is denied. For example, if the portable device 106 was not within the administrator-defined geofencing of the requested access point, the geolocation of the portable device 106 would not be validated in step 1408, and the access point control request would be denied in step 1416. In one embodiment, the denial of the access point control request is returned and displayed to the user 103 via the display 128 of the portable device 106.

If the geolocation of the portable device is validated was step 1408, method 1400 proceeds from step 1412 to step 1414. In step 1414, the access point control status is sent and/or updated to match the user request. In step 1418, access point hardware is controlled based on the control status. Access point control hardware may include, but is not limited to, locking mechanisms, vehicle ignition hardware, vending machine distribution hardware, and the like. Access point control hardware may be set using any means known in the art including, but not limited to, API, wireline communication circuitry, wireless communication circuitry (e.g., internet, cellular, radio, WiFi, Bluetooth, and the like), and the like. For example, if a user 103 submitted a "lock" request to a door access point, the locking mechanism on the door may be set to a "locked" configuration via API.

In step 1420, access control is granted and the access control status is returned. In one embodiment, the access server 104 retrieves the control status of the access point control hardware and responds to the portable device 106 with the status of the access point control hardware. In another embodiment, the display 128 of portable device 106 indicates the control status of the access control request and indicates that the access control request has been granted.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system comprising:
a portable device;
a plurality of access point devices, each of the access point devices including an access mechanism for selectively providing access to an authorized user, wherein one or more of the plurality of access point devices comprise at least one of a doorway of a residence, a doorway of a commercial building, or a doorway of a hotel room; and
a server including one or more processors, the one or more processors communicatively coupled to the access point device and the portable device, wherein the one or more processors are configured to execute program instructions stored in memory, the program instructions configured to cause the one or more processors to:
determine whether a user of the portable device is authorized to access the plurality of access point devices based on one or more credentials received from the portable device and whether the user has authorization to access the portable device;
retrieve a location of the portable device via location circuitry contained within the portable device;
determine whether the location of the portable device is within a plurality of pre-defined geographical regions based on location data acquired via the location circuitry contained within the portable device, wherein each access point device of the plurality of access point devices has a unique pre-defined geographical region;
upon determination of user authorization to the plurality of access point devices and that the location of the portable device is within two or more of the pre-defined regions, automatically display a plurality of graphical indicators of the plurality of access point devices on a display of the portable device, wherein the plurality of access point devices are displayed in real time according to a distance from each access point device of the plurality of access point devices and the portable device, wherein the display of the plurality of access point devices is updated when the location of the portable device has changed;
determine whether the one or more displayed access points have been controlled by the user;
upon determination of user control of the one or more displayed access points, display a status of a controlled access point of the one or more displayed access points to the user;
receive a user selection of a selected access point device via a user interface of the portable device; and
upon receiving the user selection of the selected access point device via the user interface of the portable device, transmit a control signal from the server to the access mechanism of the selected access point to direct the access mechanism of the selected access point device to provide access to the user without the access mechanism directly communicating with the portable device.

2. The system of claim 1, wherein one or more of the plurality of access point devices comprises:
a vending machine.

3. The system of claim 1, wherein one or more of the plurality of access point devices comprises:
a lock box.

4. The system of claim 1, wherein one or more of the plurality of access point devices comprises:
an appliance.

5. The system of claim 1, wherein one or more of the plurality of access point devices comprises:
one or more electronic resources.

6. The system of claim 5, wherein the one or more electronic resources comprise:
at least one of a desktop computer, a computer terminal, a portable computer, or a server.

7. The system of claim 5, wherein the one or more electronic resources comprises:
a computer sub-system, wherein the computer sub-system includes one or more documents or files on the one or more electronic resources.

8. The system of claim 1, wherein the portable device comprises:
at least one of a mobile phone, a laptop, an ultrabook, a personal digital assistant, a tablet, a wearable device, or a dedicated electronic device.

9. The system of claim 1, wherein the authorization to access the portable device is determined by at least one of a password, a PIN, fingerprint information, eye scan information, facial recognition information, or voice recognition information.

10. The system of claim 1, further comprising:
an administrative device, wherein the administrative device is configured for adjusting the pre-defined geographical region.

11. The system of claim 1, wherein the location circuitry comprises:
global position system (GPS) circuitry.

12. The system of claim 1, wherein the location circuitry comprises:
WiFi location services circuitry.

13. The system of claim 1, wherein the program instructions are further configured to cause the one or more processors to:
retrieve a time of a request for access to the selected access point device; and
determine whether the time of the request for access is within a pre-defined accessible time range.

14. The system of claim 13, wherein the program instructions are further configured to cause the one or more processors to:
upon determination that the request for access is within the pre-defined accessible time range, direct the selected access point device to provide access to the user.

15. The system of claim 1, wherein the plurality of pre-defined geographical regions includes at least one of a pre-defined distance from the plurality of access point devices or a pre-defined geographical boundary.

16. The system of claim 1, wherein determining whether a user of the portable device is authorized to access the plurality of access point devices based on one or more credentials received from the portable device includes determining whether the user has obtained access to the portable device.

17. The system of claim 1, wherein retrieving the location of the portable device includes using an identification marker proximate to the access point device.

18. The system of claim 1, wherein the access mechanism is an electronically controlled door lock.

19. The system of claim 18, wherein the electronically controlled door lock includes a solenoid configured to actuate a bolt.

20. The system of claim 18, wherein the electronically controlled door lock includes an electromagnetic lock.

21. The system of claim 1, wherein the access mechanism is a solenoid configured to actuate a vending mechanism of a vending machine.

22. The system of claim 1, wherein one or more of the plurality of access point devices is portable.

23. The system of claim 1, wherein the program instructions are further configured to cause the one or more processors to:
upon determination the user does not have authorization to an access point device, suppress display of the graphical indicator of the access point device on the display of the portable device.

24. A system comprising:
a server including one or more processors, the one or more processors communicatively coupled to a plurality of access point devices and a portable device, wherein one or more of the plurality of access point devices comprise at least one of a doorway of a residence, a doorway of a commercial building, or a doorway of a hotel room, wherein the one or more processors are configured to execute program instructions stored in memory, the program instructions configured to cause the one or more processors to:
determine whether a user of the portable device is authorized to access the plurality of access point devices based on one or more credentials received from the portable device and whether the user has authorization to access the portable device;
retrieve a location of the portable device via location circuitry contained within the portable device;
determine whether the location of the portable device is within a plurality of pre-defined geographical regions based on location data acquired via the location circuitry contained within the portable device, wherein each access point device of the plurality of access point devices has a unique pre-defined geographical region;
upon determination of user authorization to the plurality of access point devices and that the location of the portable device is within two or more of the pre-defined regions, automatically display a plurality of graphical indicators of the plurality of access point devices on a display of the portable device, wherein the plurality of access point devices are displayed in real time according to a distance from each access point device of the plurality of access point devices and the portable device, wherein the display of the plurality of access point devices is updated when the location of the portable device has changed;
determine whether the one or more displayed access points have been controlled by the user;
upon determination of user control of the one or more displayed access points, display a status of a controlled access point of the one or more displayed access points to the user;
receive a user selection of a selected access point device via a user interface of the portable device; and
upon receiving the user selection of the selected access point device via the user interface of the portable device, transmit a control signal from the server to the access mechanism of the selected access point to direct the access mechanism of the selected access point device to provide access to the user without the access mechanism directly communicating with the portable device.

25. The system of claim 24, wherein one or more of the plurality of access point devices is portable.

26. The system of claim 24, wherein the program instructions are further configured to cause the one or more processors to:
upon determination the user does not have authorization to an access point device, suppress display of the graphical indicator of the access point device on the display of the portable device.

* * * * *